(12) United States Patent
Hammami et al.

(10) Patent No.: US 7,591,990 B2
(45) Date of Patent: Sep. 22, 2009

(54) PROCESSES FOR PREPARING CHALCOPYRITE-TYPE COMPOUNDS AND OTHER INORGANIC COMPOUNDS

(75) Inventors: Amer Hammami, Ville Mont-Royal (CA); Benoit Marsan, Sainte-Julie (CA); Fabrice Courtel, Brossard (CA); Mario Morin, Dorval (CA)

(73) Assignee: Transfert Plus, S.E.C. Inc., Montreal (CA)

( * ) Notice: Subject to any disclaimer, the term of this patent is extended or adjusted under 35 U.S.C. 154(b) by 60 days.

(21) Appl. No.: 11/913,607

(22) PCT Filed: May 8, 2006

(86) PCT No.: PCT/CA2006/000738

§ 371 (c)(1),
(2), (4) Date: Nov. 5, 2007

(87) PCT Pub. No.: WO2006/119621

PCT Pub. Date: Nov. 16, 2006

(65) Prior Publication Data

US 2008/0187483 A1 Aug. 7, 2008

Related U.S. Application Data

(60) Provisional application No. 60/678,176, filed on May 6, 2005.

(51) Int. Cl.
*C01B 19/00* (2006.01)
*C01B 19/04* (2006.01)
*C01B 17/20* (2006.01)

(52) U.S. Cl. ........... 423/508; 423/509; 423/511; 423/561.1; 423/566.1; 423/495; 252/62.3 ZT; 252/62.3 V

(58) Field of Classification Search ............... 423/508, 423/509, 511, 561.1, 566.1, 495; 252/62.3 ZT, 252/62.3 V
See application file for complete search history.

(56) References Cited

U.S. PATENT DOCUMENTS

| | | | |
|---|---|---|---|
| 4,323,480 A | * | 4/1982 | Dines et al. ............ 502/215 |
| 4,390,514 A | * | 6/1983 | Chianelli et al. ......... 423/509 |
| 5,866,752 A | | 2/1999 | Goozner |
| 6,752,976 B2 | | 6/2004 | Iwasaki |
| 6,821,337 B2 | | 11/2004 | Bawendi et al. |

FOREIGN PATENT DOCUMENTS

EP 0732752 9/1996

OTHER PUBLICATIONS

Graham A. Shaw et al., "Solvent Mediated Metathetical Approach to the Room Temperature Synthesis of Ternary (Mixed Metal) Chalcogenide Materials in Liquid Ammonia", Main Group Metal Chemistry, 2002, 453-462, vol. 25, No. 7.
Constantin Czekelius et al., "A Simple Colloidal Route to Nanocrystalline ZnO/CuInS2 Bilayers", Adv. Mater, 1999, 643-646, 11, No. 8.

* cited by examiner

*Primary Examiner*—Timothy C Vanoy
(74) *Attorney, Agent, or Firm*—Bereskin & Parr, LLP/S.E.N.c.R.L., s.r.l.

(57) ABSTRACT

There is provided a process for preparing compounds of formula $M^3M^1A_2$. The process comprises reacting a compound of formula $M^2M^1A_2$ with a compound of formula $M^3X^2$, in the presence of at least one coordinating solvent. $M^1$ can be chosen from $B^{3+}$, $Al^{3+}$, $Ga^{3+}$, $In^{3+}$, $Tl^{3+}$, $Fe^{3+}$, and $Au^{3+}$; $M^2$ can be chosen from $Li^+$, $Na^+$, $K^+$, $Cs^+$, $(T^1)_3Si$—, and $N(T^2)_4^+$; $M^3$ can be chosen from $Cu^+$, $Ag^+$, $Li^+$, $Na^+$, $K^+$, $Cs^+$, $Rb^+$, $Fr^+$, $Au^+$, and $Hg^+$; A can be chosen from S and Se; and $X^2$ can be chosen from $Cl^-$, $Br^-$, $I^-$, $F^-$, $CH_3COO^-$, $NO_3^-$, and $CN^-$. Such compounds can be used for various purposes in the field of electrochemistry.

38 Claims, 16 Drawing Sheets

FIG_1

FIG_3

FIG_4

FIG_6

FIG_7

FIG_8

FIG_9

FIG_11

FIG_14

PROCESSES FOR PREPARING CHALCOPYRITE-TYPE COMPOUNDS AND OTHER INORGANIC COMPOUNDS

CROSS-REFERENCE TO RELATED APPLICATIONS

This application claims the benefit of U.S. provisional application No. 60/678,176 filed on May 6, 2005 which is hereby incorporated by reference in its entirety.

TECHNICAL FIELD

The present invention relates to improvements in the field of preparation of inorganic compounds. In particular, this invention relates to the preparation of chalcopyrite-type compounds and other inorganic compounds such as compounds of families III-V or II-VI.

BACKGROUND OF THE INVENTION

So far, several attempts have been made so as to provide an efficient process for preparing chalcopyrite-type compounds (such as $CuInS_2$, $CuInSe_2$, $AgInS_2$, etc.) and other inorganic compounds such as compounds of families III-V or II-VI (for example InP, GaN, CdS, CdSe, etc.). Many of these proposed processes were related to the preparation of nanocrystalline compounds. However, several of the proposed solutions were related to costly and tedious processes. These processes often required costly reagents or comprised several steps. Some of these steps were also carried out under toxic conditions. Some colloidal processes have also been proposed but they often lead to compounds which are not highly crystalline.

Czekelius et al. in *Advanced Materials*, 1999, vol. 11(8), 643-646, describe a process for preparing nanocrystalline $CuInS_2$. This two-steps process, however, requires the use of costly reagents. Also, this process uses phosphites which may form a resistive layer at the surface of the obtained $CuInS_2$. Such a resistive layer may eventually cause a diminution of absorption of the visible light and a significant ohmic drop in a device incorporating such a material.

It would therefore be highly desirable to be provided with a process that would overcome the above-mentioned drawbacks.

SUMMARY OF THE INVENTION

It is therefore an object of the present invention to provide a process that would overcome the prior art drawbacks.

It is also another object of the present invention to provide a process for preparing chalcopyrite-type compounds, such as nanocrystalline chalcopyrite-type compounds, easily and at low costs.

It is also another object of the present invention to provide a process for preparing chalcopyrite-type compounds, such as nanocrystalline chalcopyrite-type compounds, which are highly crystalline.

It is also another object of the present invention to provide a process for preparing compounds of families III-V or II-VI easily and at low costs.

It is also another object of the present invention to provide a process for preparing nanocrystalline compounds of families III-V or II-VI easily and at low costs.

According to one aspect of the invention, there is provided a process for preparing a compound of formula $M^3M^1A_2$. The process comprises reacting a compound of formula $M^2M^1A_2$ with a compound of formula $M^3X^2$, in the presence of at least one coordinating solvent, in order to obtain the compound of formula $M^3M^1A_2$, wherein
  $M^1$ is chosen from $B^{3+}$, $Al^{3+}$, $Ga^{3+}$, $In^{3+}$, $Tl^{3+}$, $Fe^{3+}$, and $Au^{3+}$;
  $M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;
  $M^3$ is chosen from $Cu^+$, $Ag^+$, $Li^+$, $Na^+$, $K^+$, $Cs^+$, $Rb^+$, $Fr^+$, $Au^+$, and $Hg^+$;
  A is chosen from S, Se, and, Te; and
  $X^2$ is chosen from $Cl^-$, $Br^-$, $I^-$, $F^-$, $CH_3COO^-$, $NO_3^-$, $OCN^-$, $SCN^-$, and $CN^-$.

According to another aspect of the invention, there is provided a process for preparing a compound of formula $M^3M^1A_2$. The process comprises:
  reacting a compound of formula $M^1(X^1)_3$ with a compound of formula $(M^2)_2A$, in the presence of at least one coordinating solvent, in order to obtain a compound of formula $M^2M^1A_2$;
  reacting the compound of formula $M^2M^1A_2$ with a compound of formula $M^3X^2$, in the presence of the at least one coordinating solvent, at least one another coordinating solvent, or mixtures thereof, in order to obtain the compound of formula $M^3M^1A_2$,
wherein
  $M^1$ is chosen from $B^{3+}$, $Al^{3+}$, $Ga^{3+}$, $In^{3+}$, $Tl^{3+}$, $Fe^{3+}$, and $Au^{3+}$;
  $M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;
  $M^3$ is chosen from $Cu^+$, $Ag^+$, $Li^+$, $Na^+$, $K^+$, $Cs^+$, $Rb^+$, $Fr^+$, $Au^+$, and $Hg^+$;
  A is chosen from S, Se, and Te;
  $X^1$ is chosen from $Cl^-$, $Br^-$, $I^-$, $F^-$, $CH_3COO^-$, $NO_3^-$, $OCN^-$, $SCN^-$, and $CN^-$; and
  $X^2$ is chosen from $Cl^-$, $Br^-$, $I^-$, $F^-$, $CH_3COO^-$, $NO_3^-$, $OCN^-$, $SCN^-$, and $CN^-$.

It was found that the above-mentioned processes are very effective for preparing, at low costs, compounds defined by the formula $M^3M^1A_2$. In fact, this process is simple and can be rapidly carried out without requiring complicated steps. In fact, this process can be carried out without the use of costly reagents. Moreover, this process can permit to avoid carrying steps under toxic conditions such as a $H_2S$ atmosphere. Such a process can also permit to obtain compounds of high purity and highly crystalline such as nanocrystalline compounds. It was also found that such a process is environment friendly and can be carried out rapidly. Moreover, it can be carried out in anhydrous conditions and considerably reduce the risks of formation of metal oxides.

According to another aspect of the invention, there is provided a process for preparing $CuInS_2$. The process comprises:
  reacting a compound of formula $M^2InS_2$ with a compound of formula $CuX^2$, in the presence of at least one coordinating solvent, in order to obtain $CuInS_2$,
wherein
  $M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched; and $X^2$ is chosen from $Cl^-$, $Br^-$, $I^-$, $F^-$, $CH_3COO^-$, $NO_3^-$, $OCN^-$, $SCN^-$, and $CN^-$.

According to another aspect of the invention, there is provided a process for preparing $CuInS_2$. The process comprises:

reacting $In(X^1)_3$ with a compound of formula $(M^2)_2S$, in the presence of at least one coordinating solvent, in order to obtain a compound of formula $M^2InS_2$; and reacting the compound of formula $M^2InS_2$ with a compound of formula $CuX^2$, in the presence of the at least one coordinating solvent, at least one another coordinating solvent, or mixtures thereof, in order to obtain $CuInS_2$ wherein $M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;

$X^1$ is chosen from $Cl^-$, $Br^-$, $I^-$, $F^-$, $CH_3COO^-$, $NO_3^-$, $OCN^-$, $SCN^-$, and $CN^-$; and $X^2$ is chosen from $Cl^-$, $Br^-$, $I^-$, $F^-$, $CH_3COO^-$, $NO_3^-$, $OCN^-$, $SCN^-$, and $CN^-$.

According to another aspect of the present invention, there is provided a process for preparing a compound of formula $M^3(M^5,M^1)A_2$. The process comprises reacting a compound of formula $M^2(M^5,M^1)A_2$ with a compound of formula $M^3X^2$, in the presence of at least one coordinating solvent, in order to obtain the compound of formula $M^3(M^5,M^1)A_2$, wherein $M^1$ is chosen from $B^{3+}$, $Al^{3+}$, $Ga^{3+}$, $In^{3+}$, $Tl^{3+}$, $Fe^{3+}$, and $Au^{3+}$;

$M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;

$M^3$ is chosen from $Cu^+$, $Ag^+$, $Li^+$, $Na^+$, $K^+$, $Cs^+$, $Rb^+$, $Fr^+$, $Au^+$, and $Hg^+$;

$M^5$ is chosen from $B^{3+}$, $Al^{3+}$, $Ga^{3+}$, $In^{3+}$, $Tl^{3+}$, $Fe^{3+}$, and $Au^{3+}$;

A is chosen from S, Se, and, Te; and $X^2$ is chosen from $Cl^-$, $Br^-$, $I^-$, $F^-$, $CH_3COO^-$, $NO_3^-$, $OCN^-$, $SCN^-$, and $CN^-$.

According to another aspect of the invention, there is provided a process for preparing a compound of formula $M^3(M^5, M^1)A_2$. The process comprises:

reacting together a compound of formula $M^1(X^1)_3$, a compound of formula $M^5(X^3)_3$, and a compound of formula $(M^2)_2A$, in the presence of at least one coordinating solvent, in order to obtain a compound of formula $M^2(M^5,M^1)A_2$;

reacting the compound of formula $M^2(M^5,M^1)A_2$ with a compound of formula $M^3X^2$, in the presence of the at least one coordinating solvent, at least one another coordinating solvent, or mixtures thereof, in order to obtain the compound of formula $M^3(M^5,M^1)A_2$, wherein $M^1$ is chosen from $B^{3+}$, $Al^{3+}$, $Ga^{3+}$, $In^{3+}$, $Tl^{3+}$, $Fe^{3+}$, and $Au^{3+}$;

$M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;

$M^3$ is chosen from $Cu^+$, $Ag^+$, $Li^+$, $Na^+$, $K^+$, $Cs^+$, $Rb^+$, $Fr^+$, $Au^+$, and $Hg^+$;

$M^5$ is chosen from $B^{3+}$, $Al^{3+}$, $Ga^{3+}$, $In^{3+}$, $Tl^{3+}$, $Fe^{3+}$, and $AU^{3+}$;

A is chosen from S, Se, and Te;

$X^1$ is chosen from $Cl^-$, $Br^-$, $I^-$, $F^-$, $CH_3COO^-$, $NO_3^-$, $OCN^-$, $SCN^-$, and $CN^-$;

$X^2$ is chosen from $Cl^-$, $Br^-$, $I^-$, $F^-$, $CH_3COO^-$, $NO_3^-$, $OCN^-$, $SCN^-$, and $CN^-$; and $X^3$ is chosen from $Cl^-$, $Br^-$, $I^-$, $F^-$, $CH_3COO^-$, $NO_3^-$, $OCN^-$, $SCN^-$, and $CN^-$.

According to another aspect of the invention, there is provided a process for preparing a compound of formula $M^4A$. The process comprises reacting a compound of formula $M^4X_2$ with a compound of formula $(M^2)_2A$, in the presence of at least one coordinating solvent, in order to obtain the compound of formula $M^4A$, wherein $M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;

$M^4$ is chosen from $Cd^{2+}$, $Co^{2+}$, $Ni^{2+}$, $Zn^{2+}$, $Hg^{2+}$, $Mg^{2+}$, $Mn^{2+}$, $Fe^{2+}$, and $Pb^{2+}$;

A is chosen from S, Se, and Te; and

X is chosen $Cl^-$, $Br^-$, $I^-$, $F^-$, $CH_3COO^-$, $NO_3^-$, $OCN^-$, $SCN^-$, and CN.

It was found that the above-mentioned process is very effective to prepare, at low costs, compounds represented by formula $M^4A$. In fact, this process is simple and can be rapidly carried out without requiring complicated steps. In fact, this process can be carried out without the use of costly reagents. Moreover, this process can permit to avoid carrying steps under toxic conditions such as a $H_2S$ atmosphere. Such a process can also permit to obtain compounds of high purity and highly crystalline such as nanocrystalline compounds. It was also found that such a process is environment friendly and can be carried out rapidly. Moreover, it can be carried out in anhydrous conditions and considerably reduce the risks of formation of metal oxides.

According another aspect of the invention, there is provided a process for preparing a compound of formula $M^1A$. The process comprises reacting together a compound of formula $M^1X_3$ and a compound of formula $(M^2)_3A$ in the presence of at least one coordinating solvent, so as to obtain the compound of formula $M^1A$, wherein $M^1$ is chosen from $B^{3+}$, $A^{3+}$, $Ga^{3+}$, $In^{3+}$, $Tl^{3+}$, $Fe^{3+}$, and $Au^{3+}$;

$M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;

A is chosen from N, P, and As; and

X is chosen from $Cl^-$, $Br^-$, $I^-$, $F^-$, $CH_3COO^-$, $NO_3^-$, $OCN^-$, $SCN^-$, and $CN^-$.

It has been found that the above-mentioned process is very effective to prepare, at low costs, compound represented by formula $M^1A$. In fact, this process is simple and can be rapidly carried out without requiring complicated steps. In fact, this process can be carried out without the use of costly reagents. Such a process can also permit to obtain compounds of high purity and highly crystalline such as nanocrystalline compounds. It was also found that such a process is environment friendly and can be carried out rapidly. Moreover, it can be carried out in anhydrous conditions and considerably reduce the risks of formation of metal oxides.

The coordinating solvent can be chosen from N-methylimidazole, pyrazole, triazole, tetrazole, and mixtures thereof. As example, the coordinating solvent can be N-methylimidazole. A further solvent can be added to the coordinating solvent. The further solvent can be chosen from acetonitrile, dichloromethane, $C_1$-$C_6$ alcohols (such as ethanol, isopropanol), dimethylsulfoxide, $C_2$-$C_{10}$ amides (such as dimethylformamide), $C_3$-$C_{10}$ linear carbonates (such as dimethylcarbonate, diethylcarbonate, ethylmethylcarbonate), $C_3$-$C_{10}$ cyclic carbonates (such as ethylene carbonate, propylene carbonate), $C_1$-$C_6$ alkylurea (such as tetramethylurea), ionic liquids, a room temperature molten salt, and mixtures thereof.

The another coordinating solvent can be chosen from N-methylimidazole, pyrazole, triazole, tetrazole, and mixtures thereof. As example, the another coordinating solvent can be N-methylimidazole. A further solvent can be added to the another coordinating solvent. The further solvent can be chosen from acetonitrile, dichloromethane, $C_1$-$C_6$ alcohols (such as ethanol, isopropanol), dimethylsulfoxide, $C_2$-$C_{10}$ amides (such as dimethylformamide), $C_3$-$C_{10}$ linear carbonates (such as dimethylcarbonate, diethylcarbonate, ethylmethylcarbonate), $C_3$-$C_{10}$ cyclic carbonates (such as ethylene carbonate, propylene carbonate), $C_1$-$C_6$ alkylurea (such as tetramethylurea), ionic liquids, a room temperature molten salt, and mixtures thereof.

Alternatively, the coordinating solvent and/or the another coordinating solvent can be chosen from:

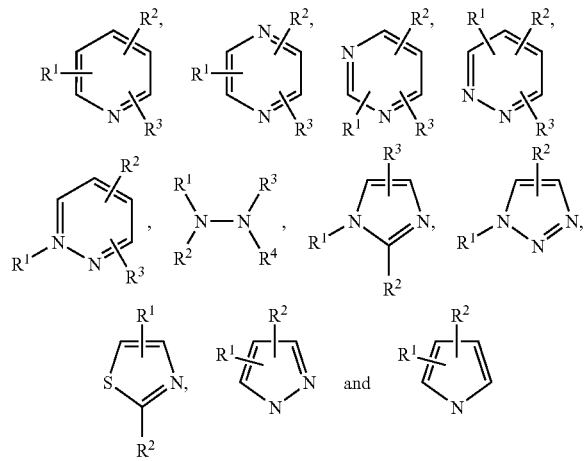

wherein $R^1$, $R^2$, $R^3$ and $R^4$ are the same or different and are chosen from a hydrogen atom, $C_1$-$C_{12}$ alkyl which is linear or branched, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_6$-$C_{20}$ aralkyl, $C_6$-$C_{20}$ alkylaryl, and $C_1$-$C_{12}$ heteroaryl, $R^1$ and $R^2$ may be joined together to form a 5 to 14 membered heterocyclyl or is a part of polymer chain or network.

Some of these compounds represented by these structures may be in a solid form at room temperature and may be heated so as to be in liquid form or they can alternatively be mixed with another organic solvent which is liquid at room temperature.

The compounds of formula $M^3M^1A_2$ can be, for example, chosen from $CuInS_2$, $CuInSe_2$, $CuInTe_2$, $AuInS_2$, $AuInSe_2$, $AuInTe_2$, $AgInS_2$, $AgInSe_2$, $AgInTe_2$, $HgInS_2$, $HgInSe_2$, $HgInTe_2$, $LiInS_2$, $LiInSe_2$, $LiInTe_2$, $CuGaS_2$, $CuGaSe_2$, $CuGaTe_2$, $AuGaS_2$, $AuGaSe_2$, $AuGaTe_2$, $AgGaS_2$, $AgGaSe_2$, $AgGaTe_2$, $HgGaS_2$, $HgGaSe_2$, $HgGaTe_2$, $CuAlS_2$, $CuAlSe_2$, $CuAlTe_2$, $AuAlS_2$, $AuAlSe_2$, $AuAlTe_2$, $AgAlS_2$, $AgAlSe_2$, $AgAlTe_2$, $HgAlS_2$, $HgAlSe_2$, $HgAlTe_2$, $CuAuS_2$, $CuAuSe_2$, $CuAuTe_2$, $AuAuS_2$, $AuAuSe_2$, $AuAuTe_2$, $AgAuS_2$, $AgAuSe_2$, $AgAuTe_2$, $HgAuS_2$, $HgAuSe_2$, $HgAuTe_2$, $LiFeS_2$, $LiFeSe_2$, $LiFeTe_2$, $AgFeS_2$, $AgFeSe_2$, $AgFeTe_2$, $LiGaS_2$, $LiGaSe_2$, and $LiGaTe_2$. They can also be chosen from $CuInS_2$, $AuInS_2$, $AgInS_2$, $AgInSe_2$, $CuGaS_2$, $AuGaS_2$, $CuAlS_2$, and $LiFeS_2$. In one particular embodiment, they may be, as example, $CuInS_2$ or $AgInS_2$.

In the processes for preparing compounds of formula $M^3M^1A_2$, $M^2$ can be, as example, chosen from $Li^+$, $Na^+$, and $K^+$; and $X^2$ can be chosen from $Cl^-$, $Br^-$, $I^-$, $F^-$, and $CN^-$. In another embodiment, $M^2$ can be $Li^+$ and $X^2$ can be $Cl^-$. In another embodiment, $M^2$ can be $Li^+$ and $X^2$ can be $I^-$. In another embodiment, $M^2$ can be $Li^+$ and $X^2$ can be $CN^-$.

In one example, $M^1$ can be $In^{3+}$; $M^2$ can be chosen from $Li^+$, $Na^+$, and $K^+$; $M^3$ can be chosen from $Cu^+$, and $Ag^+$; A can be chosen from S and Se; and $X^2$ can be chosen from $Cl^-$, $Br^-$, $I^-$, $F^-$, and $CN^-$.

In another example, $M^1$ can be $In^{3+}$; $M^2$ can be chosen from $Li^+$, $Na^+$, and $K^+$; $M^3$ can be chosen from $Cu^+$, and $Ag^+$; A can be S; and $X^2$ can be chosen from $Cl^-$, and $CN^-$.

In another example, $M^1$ can be chosen from $B^{3+}$, $Al^{3+}$, $Ga^{3+}$, $In^{3+}$, $Tl^{3+}$, $Fe^{3+}$, and $Au^{3+}$; $M^2$ can be chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched; $M^3$ can be chosen from $Ag^+$, $Li^+$, $Na^+$, $K^+$, $Cs^+$, $Rb^+$, $Fr^+$, $Au^+$, and $Hg^+$; A can be chosen from S and Se; and $X^2$ can be chosen from $Cl^-$, $Br^-$, $I^-$, $F^-$, $CH_3COO^-$, $NO_3^-$, and $CN^-$.

In another example, $M^1$ can be chosen from $B^{3+}$, $Al^{3+}$, $Ga^{3+}$, $In^{3+}$, $Tl^{3+}$, $Fe^{3+}$, and $Au^{3+}$; $M^2$ can be chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched; $M^3$ can be chosen from $Cu^+$, $Ag^+$, $Li^+$, $Na^+$, $K^+$, $Cs^+$, $Rb^+$, $Fr^+$, $Au^+$, and $Hg^+$; A can be Se; and $X^2$ can be chosen from $Cl^-$, $Br^-$, $I^-$, $F^-$, $CH_3COO^-$, $NO_3^-$, and $CN^-$.

In another example, $M^1$ can be chosen from $B^{3+}$, $Al^{3+}$, $Ga^{3+}$, $In^{3+}$, $Tl^{3+}$, $Fe^{3+}$, and $Au^{3+}$; $M^2$ can be chosen from $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched; $M^3$ can be chosen from $Cu^+$, $Ag^+$, $Li^+$, $Na^+$, $K^+$, $Cs^+$, $Rb^+$, $Fr^+$, $Au^+$, and $Hg^+$; A can be chosen from S and Se; and $X^2$ can be chosen from $Br^-$, $I^-$, $F^-$, $CH_3COO^-$, $NO_3^-$, and $CN^-$.

In another example, when $M^3M^1A_2$ is $CuInS_2$, $M^2$ can be chosen from $Cs^+$, $(T^1)_3Si-$, and $N(T^2)_4^+$. In a further example when $M^3M^1A_2$ is $CuInS_2$, $X^2$ can be chosen from $Br^-$, $I^-$, $F^-$, $CH_3COO^-$, $NO_3^-$, and $CN^-$. In still a further example, when $M^3M^1A_2$ is $CuInS_2$, $M^2$ can be chosen from $Cs^+$, $(T^1)_3Si-$, and $N(T^2)_4^+$, and $X^2$ can be chosen from $Br^-$, $I^-$, $F^-$, $CH_3COO^-$, $NO_3^-$, and $CN^-$.

When preparing a compound of formula $M^3M^1A_2$, the reaction between $M^3X^2$ and $M^2M^1A_2$ can be carried out as follows:

For example, $M^3X^2$ and $M^2M^1A_2$ can be reacted together at a temperature of about −10° C. to about 180° C. They can also be reacted together at other ranges of temperature such as about −5° C. to about 50° C., about 0° C. to about 40° C., about 5 to about 35° C., or about 15 to about 30° C. Alternatively, $M^3X^2$ and $M^2M^1A_2$ can be reacted together at room temperature.

For example, $M^3M^1A_2$ can be precipitated, and separated from a mixture comprising the coordinating solvent and a by-product solubilized therein, by means of a filtration. Such a by-product can be $M^2X^2$. Alternatively, $M^3M^1A_2$ can be, for example, precipitated, and separated from the coordinating solvent and the compound of formula $M^2X^2$, by means of a filtration.

In one embodiment, the compound of formula $M^2M^1A_2$ can be reacted with the compound of formula $M^3X^2$ by adding the compound of formula $M^3X^2$ to a composition comprising the compound of formula $M^2M^1A_2$ and the coordinating solvent.

In another embodiment, the compound of formula $M^2M^1A_2$ can be reacted with the compound of formula $M^3X^2$ by adding a composition comprising the compound of formula $M^3X^2$ and the coordinating solvent to a composition comprising the compound of formula $M^2M^1A_2$ and the coordinating solvent. For example, the composition comprising the compound of formula $M^3X^2$ and the coordinating solvent can be added dropwise to the composition comprising the compound of formula $M^2M^1A_2$ and the coordinating solvent.

In another embodiment, the compound of formula $M^2M^1A_2$ can be reacted with the compound of formula $M^3X^2$ by adding the compound of formula $M^3X^2$ to a composition comprising the compound of formula $M^2M^1A_2$ and the another coordinating solvent.

In another embodiment, the compound of formula $M^2M^1A_2$ can be reacted with the compound of formula $M^3X^2$ by adding a composition comprising the compound of formula $M^3X^2$ and the another coordinating solvent to a composition comprising the compound of formula $M^2M^1A_2$ and the another coordinating solvent. For example, the composition comprising the compound of formula $M^3X^2$ and the another coordinating solvent can be added dropwise to the composition comprising the compound of formula $M^2M^1A_2$ and the another coordinating solvent.

For example, the compound of formula $M^2M^1A_2$ can be reacted with the compound of formula $M^3X^2$ in the presence of the coordinating solvent.

The reaction between $M^1(X^1)_3$ and $(M^2)_2A$ can be, as example, carried out as follows:

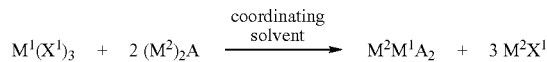

For example, $M^1(X^1)_3$ and $(M^2)_2A$ can be reacted together at a temperature of about −10° C. to about 180° C. They can also be reacted together at other ranges of temperature such as about −5° C. to about 50° C., about 0° C. to about 40° C., about 5 to about 35° C., or about 15 to about 30° C. Alternatively, $M^1(X^1)_3$ and $(M^2)_2A$ can be reacted together at room temperature.

In one embodiment, the compound of formula $M^1(X^1)_3$, the compound of formula $(M^2)_2A$, and the coordinating solvent can be mixed together and agitated in order to obtain the compound of formula $M^2M^1A_2$. Agitation can be provided by various techniques known to the person skilled in the art such as sonic bath, stirring with various agitation means, etc.

In another embodiment, a composition comprising the compound of formula $M^1(X^1)_3$ and the coordinating solvent can be mixed with a composition comprising the compound of formula $(M^2)_2A$ and the coordinating solvent.

When preparing a compound of formula $M^3M^1A_2$, $X^1$ and $X^2$ can be different. Alternatively, they can be the same. For example, $X^1$ can be chosen from $Cl^-$, $Br^-$, $I^-$, $F^-$, $CH_3COO^-$, and $NO_3^-$. Alternatively, it can be chosen from $Cl^-$, and $I^-$ or it can be $Cl^-$.

In one embodiment, the compound of formula $M^3M^1A_2$ can be $CuInS_2$. When preparing such a compound by using compounds of formulas $CuX^2$ and $M^2InS_2$, the latter two can be reacted together as follows:

For example, $CuX^2$ and $M^2InS_2$ can be reacted together at a temperature of about −10° C. to about 180° C. They can also be reacted together at other ranges of temperature such as about −5° C. to about 50° C., about 0° C. to about 40° C., about 5 to about 35° C., or about 15 to about 30° C. Alternatively, $CuX^2$ and $M^2InS_2$ can be reacted together at room temperature.

For example, $CuInS_2$ can be precipitated, and separated from a mixture comprising the coordinating solvent and a by-product solubilized therein, by means of a filtration. Such a by-product can be $M^2X^2$. Alternatively, $CuInS_2$ can be, for example, precipitated, and separated from the coordinating solvent and the compound of formula $M^2X^2$, by means of a filtration.

In one embodiment, the compound of formula $M^2InS_2$ can be reacted with the compound of formula $CuX^2$ by adding the compound of formula $CuX^2$ to a composition comprising the compound of formula $M^2InS_2$ and the coordinating solvent.

In another embodiment, the compound of formula $M^2InS_2$ can be reacted with the compound of formula $CuX^2$ by adding a composition comprising the compound of formula $CuX^2$ and the coordinating solvent to a composition comprising the compound of formula $M^2InS_2$ and the coordinating solvent. For example, the composition comprising the compound of formula $CuX^2$ and the coordinating solvent can be added dropwise to the composition comprising the compound of formula $M^2InS_2$ and the coordinating solvent. $X^2$ can be, as example, chosen from $Cl^-$ and $I^-$ or it can be $Cl^-$. For example, the compound of formula $M^2InS_2$ can be reacted with the compound of formula $CuX^2$ in the presence of the coordinating solvent. The $CuInS_2$ obtained can be nanocrystalline.

In one embodiment, the compound of formula $M^2InS_2$ can be reacted with the compound of formula $CuX^2$ by adding the compound of formula $CuX^2$ to a composition comprising the compound of formula $M^2InS_2$ and the another coordinating solvent.

In another embodiment, the compound of formula $M^2InS_2$ can be reacted with the compound of formula $CuX^2$ by adding a composition comprising the compound of formula $CuX^2$ and the another coordinating solvent to a composition comprising the compound of formula $M^2InS_2$ and the another coordinating solvent. For example, the composition comprising the compound of formula $CuX^2$ and the another coordinating solvent can be added dropwise to the composition comprising the compound of formula $M^2InS_2$ and the another coordinating solvent.

$X^2$ can be, as example, chosen from $Cl^-$ and $I^-$ or it can be $Cl^-$. For example, the compound of formula $M^2InS_2$ can be reacted with the compound of formula $CuX^2$ in the presence of the coordinating solvent. The $CuInS_2$ obtained can be nanocrystalline.

When preparing $CuInS_2$, $In(X^1)_3$ can be reacted with the compound of formula $(M^2)_2S$, in the presence of the coordinating solvent. Such a reaction can be carried out as follows:

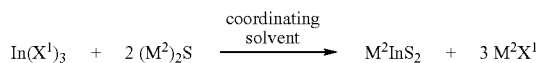

For example, $In(X^1)_3$ and $(M^2)_2S$ can be reacted together at a temperature of about $-10°$ C. to about $180°$ C. They can also be reacted together at other ranges of temperature such as about $-5°$ C. to about $50°$ C., about $0°$ C. to about $40°$ C., about 5 to about $35°$ C., or about 15 to about $30°$ C. Alternatively, $In(X^1)_3$ and $(M^2)_2S$ can be reacted together at room temperature.

In one embodiment, the compound of formula $In(X^1)_3$, the compound of formula $(M^2)_2S$, and the coordinating solvent can be mixed together and agitated in order to obtain $CuInS_2$. Agitation can be provided by various techniques known to the person skilled in the art such as sonic bath, stirring with various agitation means, etc.

In another embodiment, a composition comprising the compound of formula $In(X^1)_3$ and the coordinating solvent can be mixed with a composition comprising the compound of formula $(M^2)_2S$ and the coordinating solvent.

When preparing $CuInS_2$, $X^1$ and $X^2$ can be different. Alternatively, they can be the same. For example, $X^1$ can be chosen from $Cl^-$, $Br^-$, $I^-$, $F^-$, $CH_3COO^-$, and $NO_3^-$. Alternatively, it can be chosen from $Cl^-$, and $I^-$ or it can be $Cl^-$. For example, $X^2$ can be chosen from $Cl^-$, and $I^-$ or it can be $I^-$.

The compounds of formula $M^3(M^5,M^1)A_2$ can be, for example, chosen from $Cu(Al,In)S_2$, $Ag(Al,In)S_2$, $Cu(Ga,In)S_2$, $Cu(Al,In)Se_2$, $Ag(Al,In)Se_2$, and $Cu(Ga,In)Se_2$. They can also be chosen from $Cu(Al,In)S_2$, $Ag(Al,In)S_2$, and $Cu(Ga,In)S_2$, or from $Cu(Al,In)Se_2$, $Ag(Al,In)Se_2$, and $Cu(Ga,In)Se_2$. For example, the molar ratio $M^5/M^1$ can have various values such as less than about 1, less than about 0.75, less than about 0.5, less than about 0.25, less than about 0.1, less than about 0.05, less than about 0.04, less than about 0.02, less than about 0.01, less than about 0.002, or less than about 0.001.

For example, when preparing a compound of formula $M^3(M^5,M^1)A_2$, the compound of formula $M^2(M^5,M^1)A_2$ can be reacted with the compound of formula $M^3X^2$ in the presence of the coordinating solvent. For example, $M^3X^2$ and $M^2(M^5,M^1)A_2$ can be reacted together at a temperature of about $-10°$ C. to about $180°$ C. They can also be reacted together at other temperatures such as about $-5°$ C. to about $50°$ C., about $0°$ C. to about $40°$ C., about 5 to about $35°$ C., or about 15 to about $30°$ C. Alternatively, $M^3X^2$ and $M^2(M^5,M^1)A_2$ can be reacted together at room temperature. In one embodiment, $M^1$ can be different than $M^5$. $M^1$ can also be the same than $M^5$. In another embodiment, $M^2$ can be chosen from $Li^+$, $Na^+$, and $K^+$; and $X^2$ can be chosen from $Cl^-$, $Br^-$, $I^-$, $F^-$, and $CN^-$. In another embodiment, $M^2$ can be $Li^+$ and $X^2$ can be $Cl^-$. In a further embodiment, $M^2$ can be $Li^+$ and $X^2$ can be $I^-$. In still a further embodiment, $M^2$ can be $Li^+$ and $X^2$ can be $CN^-$. In another embodiment, $M^2$ can be chosen from $Li^+$, $Na^+$, and $(CH_3)_3Si$—. Alternatively, $M^2$ can be $Li^+$.

When preparing a compound of formula $M^3(M^5,M^1)A_2$, $M^1(X^1)_3$, $M^5(X^3)_3$, and $(M^2)_2A$ can be, as example, reacted together at a temperature of about $-10°$ C. to about $180°$ C. They can also be reacted together at other ranges of temperature such as about $-5°$ C. to about $50°$ C., about $0°$ C. to about $40°$ C., about 5 to about $35°$ C., or about 15 to about $30°$ C. Alternatively, $M^1(X^1)_3$, $M^5(X^3)_3$, and $(M^2)_2A$ can be reacted together at room temperature.

For example, when preparing a compound of formula $M^3(M^5,M^1)A_2$, $X^1$ and $X^2$ can be different. Alternatively, they can be the same. $X^1$, $X^2$, and $X^3$ can also be the same. In one embodiment, $X^1$ can be chosen from $Cl^-$, $Br^-$, $I^-$, $F^-$, $CH_3COO^-$, and $NO_3^-$. In another embodiment, $X^1$ can be $Cl^-$. In another embodiment, $M^1$ can be different than $M^5$.

The compounds of formula $M^4A$ can be, for example, chosen from CdS, CdSe, CdTe, CoS, CoSe, CoTe, NiS, NiSe, NiTe, MgS, MgSe, MgTe, MnS, MnSe, MnTe, FeS, FeSe, FeTe, ZnS, ZnSe, ZnTe, PbS, PbSe, PbTe, ZnS, ZnSe, and ZnTe. Alternatively, they can be chosen from CdS, CdSe, CdTe, CoS, and ZnSe.

When preparing a compound of formula $M^4A$ by reacting a compound of formula $M^4X_2$ with a compound of formula $(M^2)_2A$, the reaction can be carried out as follows:

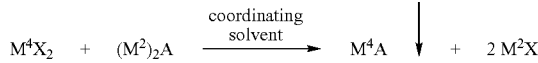

For example, $M^4X_2$ and $(M^2)_2A$ can be reacted together at a temperature of about $-10°$ C. to about $180°$ C. They can also be reacted together at other ranges of temperature such as about $-5°$ C. to about $50°$ C., about $0°$ C. to about $40°$ C., about 5 to about $35°$ C., or about 15 to about $30°$ C. Alternatively, $M^4X_2$ and $(M^2)_2A$ can be reacted together at room temperature.

The compound of formula $M^4A$ can be precipitated, and separated from a mixture comprising the coordinating solvent and a by-product solubilized therein, by means of a filtration. The by-product can be $M^2X$. The compound of formula $M^4A$ can be precipitated, and separated from the coordinating solvent and the compound of formula $M^2X$, by means of a filtration.

In one embodiment, when preparing a compound of formula $M^4A$, X can be chosen from $Cl^-$, $Br^-$, $I^-$, and $CN^-$. Alternatively, it can be chosen from $Cl^-$, $I^-$, and $CN^-$. $M^2$ can be chosen from $Li^+$, $Na^+$, and $(CH_3)_3Si$—.

The compounds of formula $M^1A$ can be, for example, chosen from GaP, GaAs, GaN, InP, InAs, and InN. Alternatively, they can be chosen from GaAs and InP. When preparing a compound of formula $M^1A$ by reacting a compound of formula $M^1X_3$ with a compound of formula $(M^2)_3A$, the reaction can be carried out as follows:

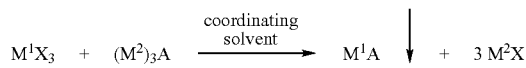

For example, $M^1X_3$ and $(M^2)_3A$ can be reacted together at a temperature of about $-10°$ C. to about $180°$ C. They can also be reacted together at other ranges of temperature such as about −5° C. to about 50° C., about 0° C. to about 40° C., about 5 to about 35° C., or about 15 to about 30° C. Alternatively, $M^1X_3$ and $(M^2)_3A$ can be reacted together at room temperature.

The compound of formula $M^1A$ can be precipitated, and separated from a mixture comprising the coordinating solvent and a by-product solubilized therein, by means of a filtration. The by-product can be $M^2X$. The compound of formula $M^1A$ can be precipitated, and separated from the coordinating solvent and the compound of formula $M^2X$, by means of a filtration.

In one embodiment, when preparing a compound of formula $M^1A$, X can be chosen from $Cl^-$, $Br^-$, $I^-$, and $CN^-$. Alternatively, it can be chosen from $Cl^-$, $I^-$, and $CN^-$. $M^2$ can be chosen from $Li^+$, $Na^+$, and $(CH_3)_3Si—$.

The processes of the present invention can further comprise drying the so-obtained compound or composition. They can be dried as example by centrifugation, heating, vacuum, or combinations thereof. The processes of the present invention can also further comprise annealing the so-obtained compound or composition. For example, they can be annealed at a temperature of at least about 75° C. Alternatively, they can be annealed at various other temperatures such as at least about 100° C., at least about 150° C., at least about 200° C., at least about 250° C., at least about 300° C., at least about 400° C., or at least about 500° C. The temperature can also be about 100° C. to about 500° C. or about 200° C. to about 400° C.

For example, the annealing treatment can be carried out over a period of at least about 30 minutes. Alternatively, the annealing treatment can be carried out over various periods of time such as at least about 45 minutes, at least about 60 minutes, at least about 90 minutes, at least about 120 minutes, or at least about 180 minutes. The duration of the annealing treatment can also be about 60 minutes to about 180 minutes.

The annealing treatment can be, as example, carried out under vacuum. The vacuum can be at least about 50 mTorr or alternatively at least about 100 mTorr.

The compounds and compositions obtained via the various processes of the present invention can be nanocrystalline. The compounds obtained may also be in the form of particles having a diameter of less than 500 nm or alternatively of other values such as less than 250 nm or less than 100 nm. The compounds and compositions obtained are, as example, semiconducting material.

The processes of the present invention can further comprise preparing an electrode comprising the obtained compound or composition. These processes can also comprise mixing the obtained compound or composition with a binder so as to obtain a mixture suitable for the preparation of an electrode or mixing the obtained compound or composition with a binder so as to obtain a suitable precursor for the preparation of an electrode.

Alternatively, the processes of the present invention can comprise mixing the obtained compound or composition with a binder so as to obtain a mixture comprising the compound or composition and the binder, and preparing an electrode with the mixture. The mixture optionally comprises a solvent such as N-methylpyridinone. As example, a thin film of the mixture can be coated on a substrate in order to prepare the electrode. Suitable substrate can comprise a metal such as Mo, Au, Al, Cu, or mixtures thereof. The mixture can further comprise a conductivity enhancer such as carbon black, graphite, carbon nanotubes, or mixtures thereof. The binder can be any suitable polymers adapted to make such a preparation and suitable for the preparation an electrode. The person skilled in the art would clearly recognize that a plurality of various polymers can be used as binder. In a non-limitative manner, the binder can be polyvinylidene fluoride (PVDF), poly(vinylidene fluoride-co-hexafluoropropylene) (PVDF-HFP), or mixtures thereof.

According to another aspect of the invention, there is provided a composition comprising at least two compounds, a first compound obtained by a process as previously defined, and a second compound obtained by a process as previously defined.

According to another aspect of the invention, there is provided a compound prepared according to a process previously defined for preparing $M^3M^1A_2$, wherein two different compounds of formula $M^1(X^1)_3$ are reacted with the compound of formula $(M^2)_2A$. As example, the two compounds of formula $M^1(X^1)_3$ can be $InCl_3$ or $GaCl_3$. They can be used in various proportions such as $InCl_3$ (90%) and $GaCl_3$ (10%), $InCl_3$ (95%) and $GaCl_3$ (5%), based on the molar ratio. Such a compound can be chosen from $Cu(Al,In)S_2$, $Ag(Al,In)S_2$, $Cu(Ga,In)S_2$, $Cu(Al,In)Se_2$, $Ag(Al,In)Se_2$, $Cu(Ga,In)Se_2$, and mixtures thereof. It was found that the obtained compounds can have a high purity and can be prepared at low costs. Moreover, it was found that the obtained compounds can be highly crystalline.

According to another aspect of the invention, there is provided the use of a process as defined in the present invention, for the preparation of a nanocrystalline compound or composition. Such a compound or composition can be used in a solar cell.

According to another aspect of the invention, there is provided the use of a process as defined in the present invention, for the preparation of a compound or composition, suitable for use in the field of optoelectronic.

According to another aspect of the invention, there is provided the use of a process as defined in the present invention, for the preparation of a compound or composition, suitable for use in the preparation of a photodiode, a transistor, a sensor, a laser diode, or a digital light projector.

According to another aspect of the invention, there is provided a method for preparing a nanocrystalline compound or composition, suitable for use in a solar cell. The method comprises carrying out a process as defined in the present invention According to another aspect of the invention, there is provided a method for preparing a compound or composition suitable for use in the field of optoelectronic, the method comprising carrying out a process as defined in the present invention.

According to another aspect of the invention, there is provided a method for preparing a compound or composition suitable for use in the preparation of a photodiode, a transistor, a sensor, a laser diode, or a digital light projector. The method comprises carrying out a process as defined in the present invention.

According to another aspect of the invention, there is provided a composition comprising at least one compound obtained by a process as defined in the present invention and a binder.

According to another aspect of the invention, there is provided a composition comprising at least two compounds, a first compound obtained by a process as defined in the present invention, and a second compound obtained by a process as defined in the present invention.

According to another aspect of the invention, there is provided the use of a compound or composition as defined in the present invention, in the manufacture of an optoelectronic device, a photoluminescent device or a wireless communication device.

According to another aspect of the invention, there is provided a method for preparing a solar cell, a photodiode, a transistor, a sensor, a laser diode or a digital light projector, comprising using a compound or composition as defined in the present invention, as a component or precursor in the preparation thereof.

According to another aspect of the invention, there is provided a method for preparing an optoelectronic device, a photoluminescent device or a wireless communication device, comprising using a compound or composition in the present invention, as a component or precursor in the preparation thereof.

According to another aspect of the invention, there is provided a nanocrystalline compound suitable for use in a solar cell. The compound is prepared by a process as defined in the present invention.

According to another aspect of the invention, there is provided a nanocrystalline compound suitable for use in the field of optoelectronic. The compound is prepared by a process as defined in the present invention.

According to another aspect of the invention, there is provided a nanocrystalline compound suitable for use in the preparation of a photodiode, a transistor, a sensor, a laser diode, or a digital light projector. The compound is prepared by a process as defined in the present invention.

According to another aspect of the invention, there is provided a solar cell, a photodiode, a transistor, a sensor, a laser diode or a digital light projector, comprising a compound or composition as defined in the present invention.

According to another aspect of the invention, there is provided an optoelectronic device, a photoluminescent device or a wireless communication device comprising a compound or composition as defined in the present invention.

According to another aspect of the invention, there is provided a compound or composition obtained by a process as defined in the present invention.

The compounds or compositions of the present invention can convert light to an electrical signal. They can also act as detectors in CDROM drives, DVD players and barcode scanners and represent the key functional element in solar panels, scanners and digital cameras. These compounds or compositions can also be useful in photovoltaic devices such as thin film solar cells. They can also be used in transistors that can be found in all electronic devices and systems. They can be used as the primary active element that acts as a switch, logic element or amplifier. The compounds or compositions of the present invention can also be used in laser diodes that can be found in CDROM drives, DVD players and barcode scanners. They can provide a compact and efficient source of coherent light. In optoelectronic devices, the compounds or compositions of the present invention can be used as transmitters and receivers so as to provide the infrared signals that can propagate over large distances along optical fibers. These transmitters can enable rapid transmission of large amount of digital information across the world through the Internet.

According to another aspect of the invention, there is provided a composition comprising $InCl_3$ and a coordinating solvent as defined in the present invention. The solvent can be N-methylimidazole.

According to another aspect of the invention, there is provided the use of the composition comprising $InCl_3$ and a coordinating solvent as defined in the present invention, as an anhydrous source of $InCl_3$.

According to another aspect of the present invention, there is provided the use of a coordinating solvent as defined in the present invention, for preparing a $InCl_3$-based composition, wherein the composition comprises the coordinating solvent and $InCl_3$ stabilized and dissolved by the latter.

According to another aspect of the present invention, there is provided the use of a coordinating solvent as defined in the present invention, for solubilizing and stabilizing $InCl_3$. For example, $InCl_3$ can be solubilized and stabilized under anhydrous conditions such as under an inert gas atmosphere as for example nitrogen or argon.

According to another aspect of the present invention, there is provided a method for preparing an $InCl_3$-based composition, comprising dissolving and stabilizing $InCl_3$ in a coordinating solvent as defined in the present invention. For example, $InCl_3$ can be solubilized and stabilized under anhydrous conditions such as under an inert gas atmosphere as for example nitrogen or argon.

According to another aspect of the present invention, there is provided in a method of using $InCl_3$ as a catalyst, the improvement wherein the $InCl_3$ is provided in the form of a composition comprising $InCl_3$ and a coordinating solvent as defined in the present invention.

BRIEF DESCRIPTION OF DRAWINGS

In the following drawings, which represent by way of examples only particular embodiments of the present invention.

DETAILED DESCRIPTION OF THE INVENTION

Further features and advantages of the invention will become more readily apparent from the following description of various particular embodiments as illustrated by way of examples.

EXAMPLES

Example 1

Synthesis of CuInS$_2$

InCl$_3$ (165.9 mg, 0.75 mmol) was dissolved in 17 mL of anhydrous N-methylimidazole (NMI) in a 250 mL two-neck flask under argon at room temperature. Lithium sulfide (137.8 mg, 1.5 mmol) was suspended in 15 mL NMI at room temperature. Both compositions or solutions were mixed together and after one hour of ultrasonic bath treatment, a transparent yellowish solution (solution A) was obtained.

In a separate 250 mL two-neck flask, CuCl (74.2 mg, 0.75 mmol) was dissolved in 9 mL NMI under argon (solution B).

After both solutions A and B were cooled to 5° C., solution B was added dropwise over 15 minutes to solution A under argon. The resulting dark orange suspension was stable against aggregation. The mixture was stirred during 12 hours at 5° C. Then, the particles were centrifuged, filtered and dried at room temperature under vacuum overnight. The CuInS$_2$ particles can eventually be annealed.

Figure 1:
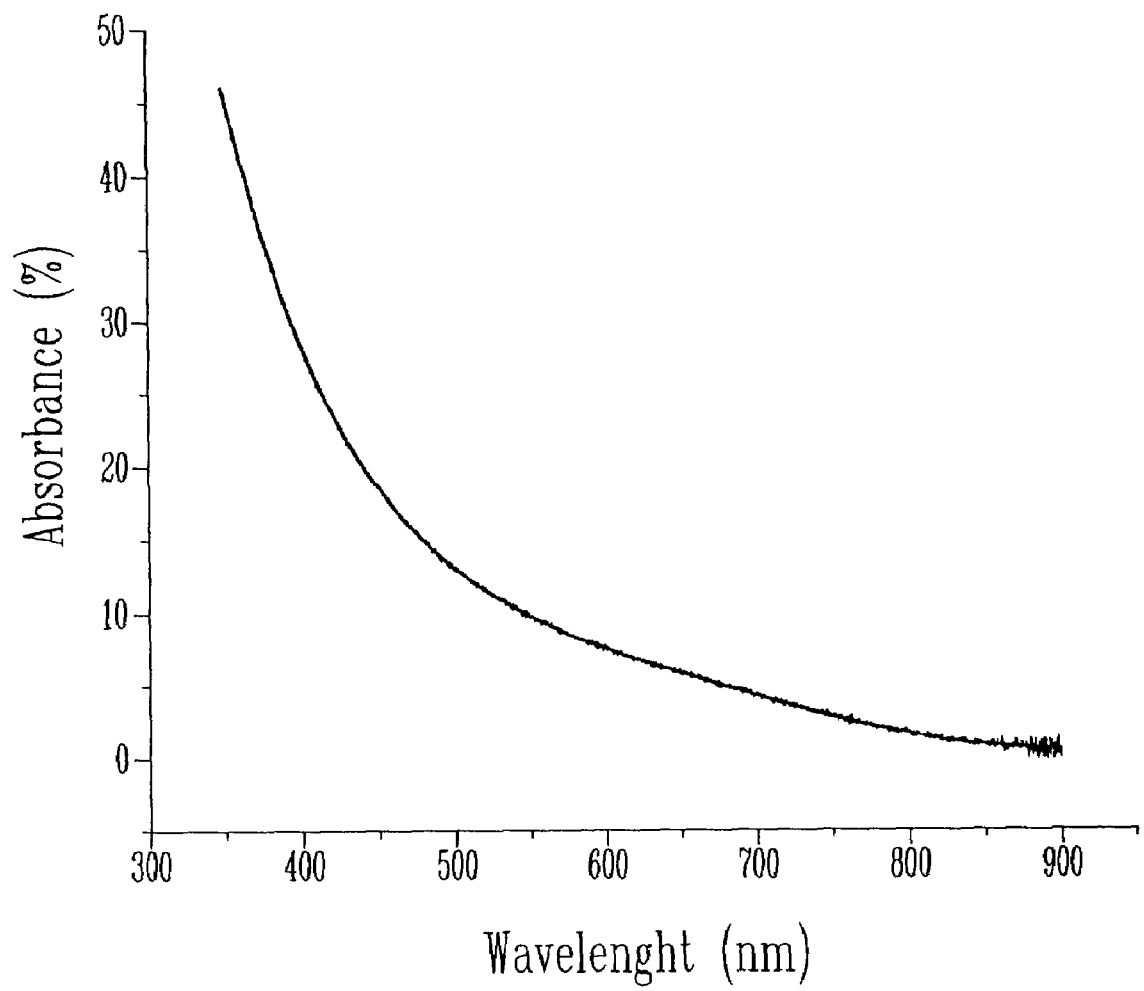
FIG. 1 shows a UV-visible absorption spectrum of a $CuInS_2$ sample obtained by a process according to one embodiment of the present invention, wherein the sample has not been annealed.
Figure 2:
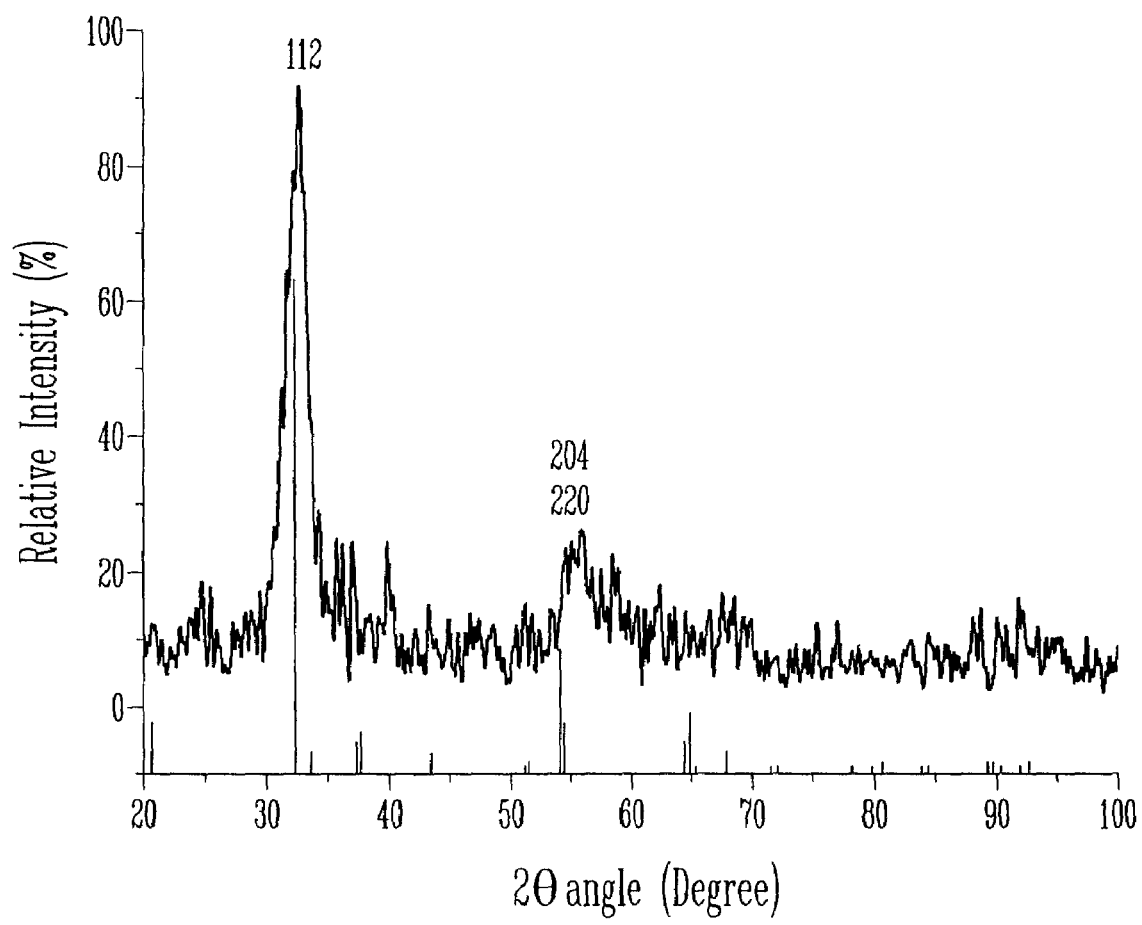
FIG. 2 shows a X-ray diffraction (XRD) pattern of the $CuInS_2$ sample analyzed in FIG. 1.
Figure 5:
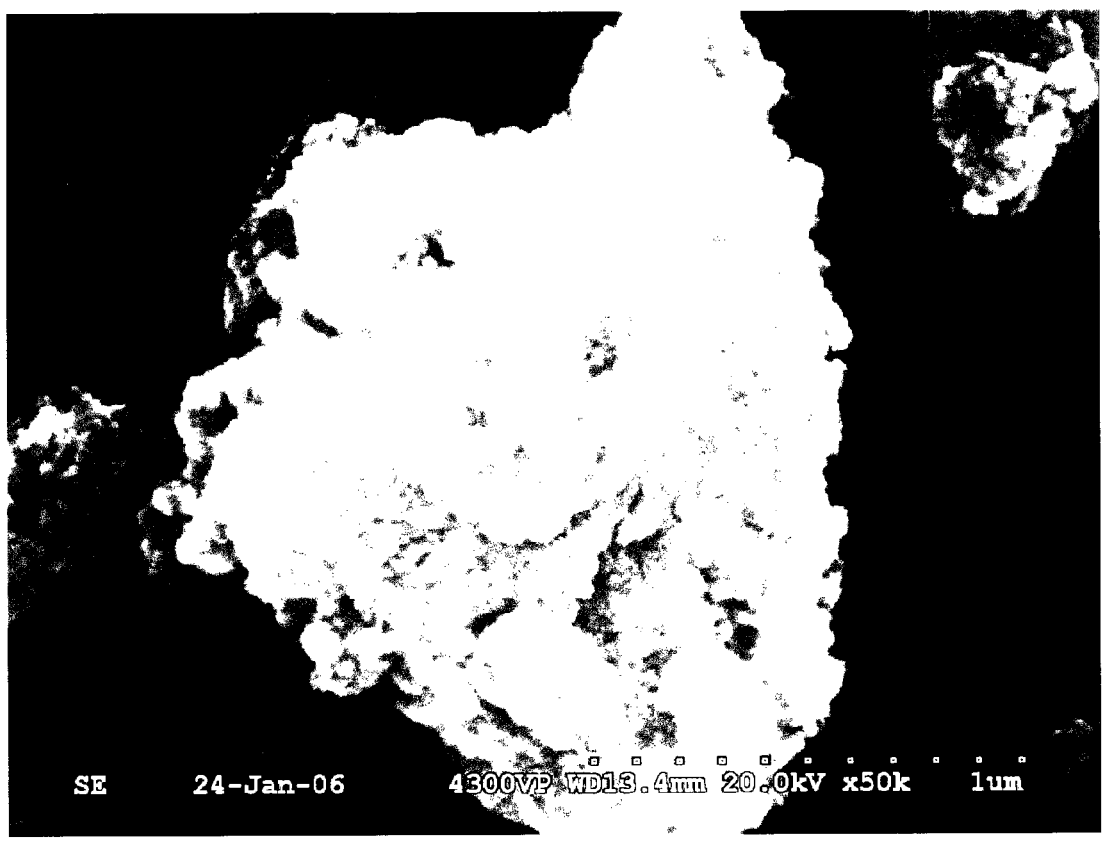
FIG. 5 shows a Scanning Electron Microscope (SEM) image of the sample analyzed in FIG. 1, wherein the scale is 1 μm.
Figure 6:
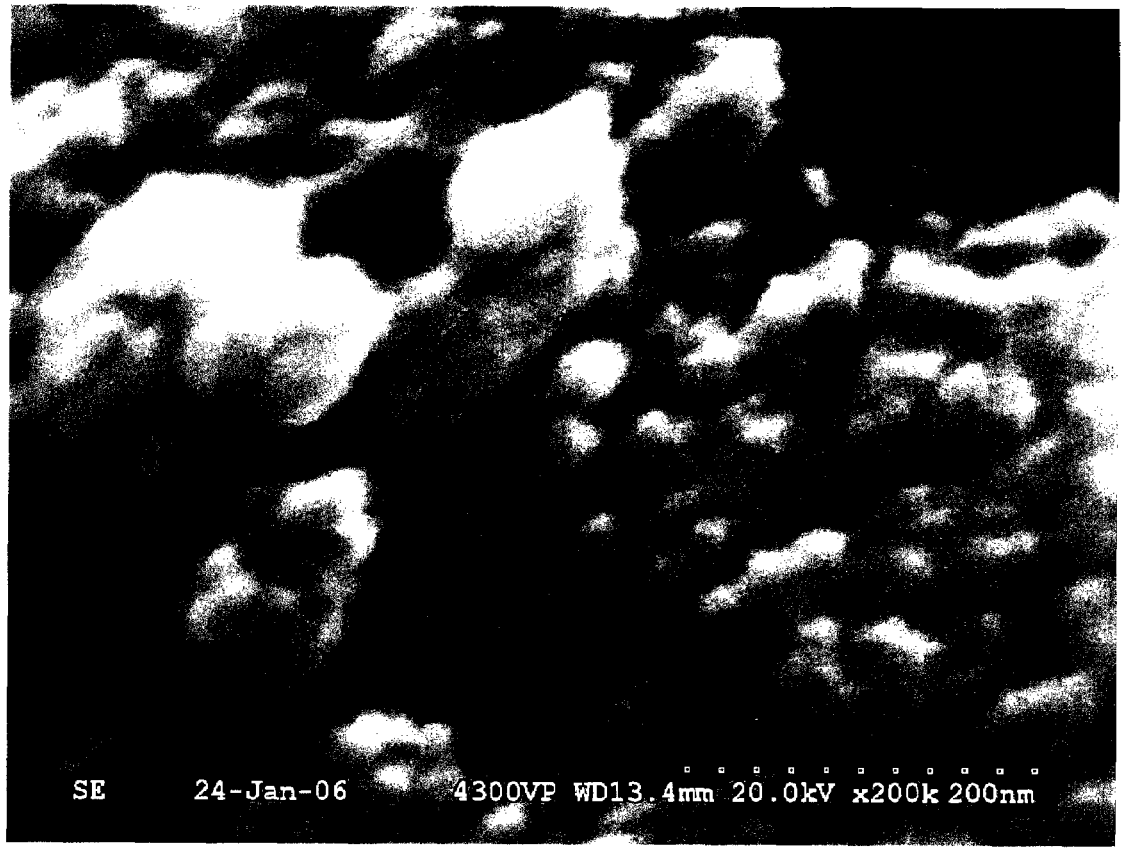
FIG. 6 shows a Scanning Electron Microscope (SEM) image of the sample analyzed in FIG. 1, wherein the scale is 200 nm.

The sample obtained in Example 1 was analyzed by UV-visible spectroscopy (FIG. 1) and by XRD (FIG. 2). The sample was also analyzed by Scanning Electron Microscopy and the results are shown in FIG. 5 (scale of 1 μm) and in FIG. 6 (scale of 200 nm).

Figure 7:
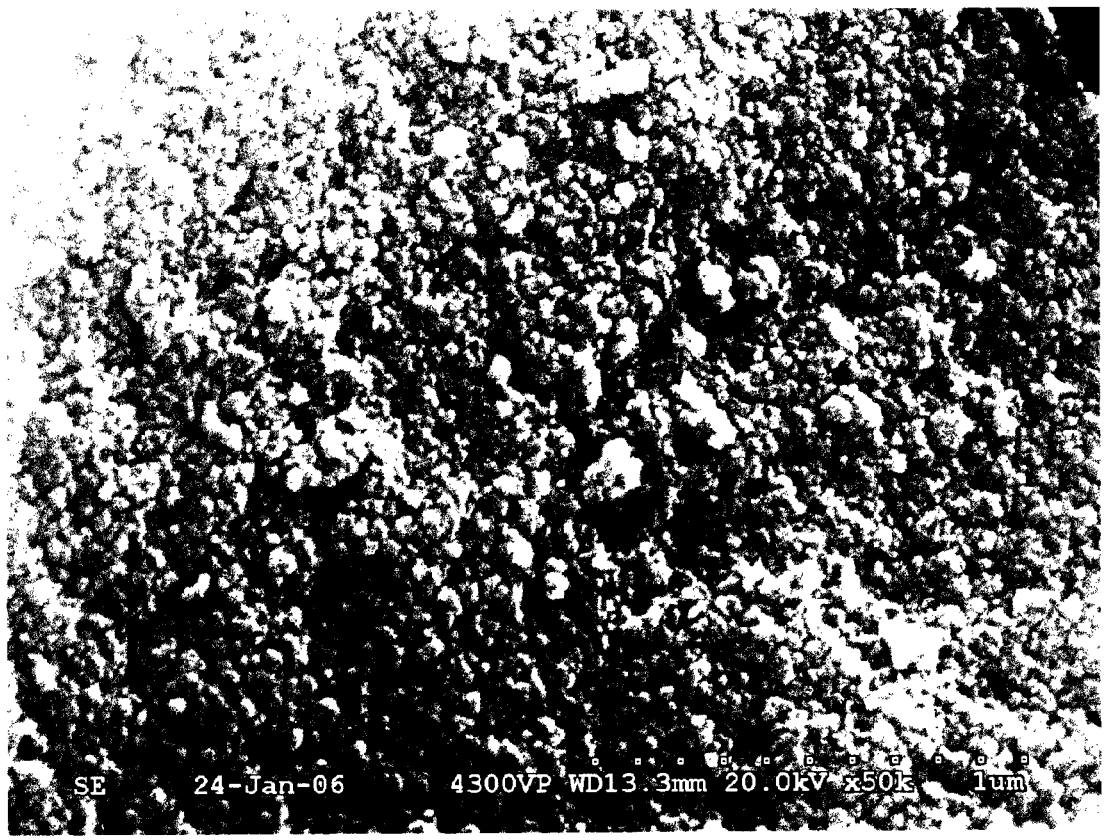
FIG. 7 shows a Scanning Electron Microscope (SEM) image of the sample analyzed in FIG. 3, wherein the scale is 1 μm.
Figure 8:
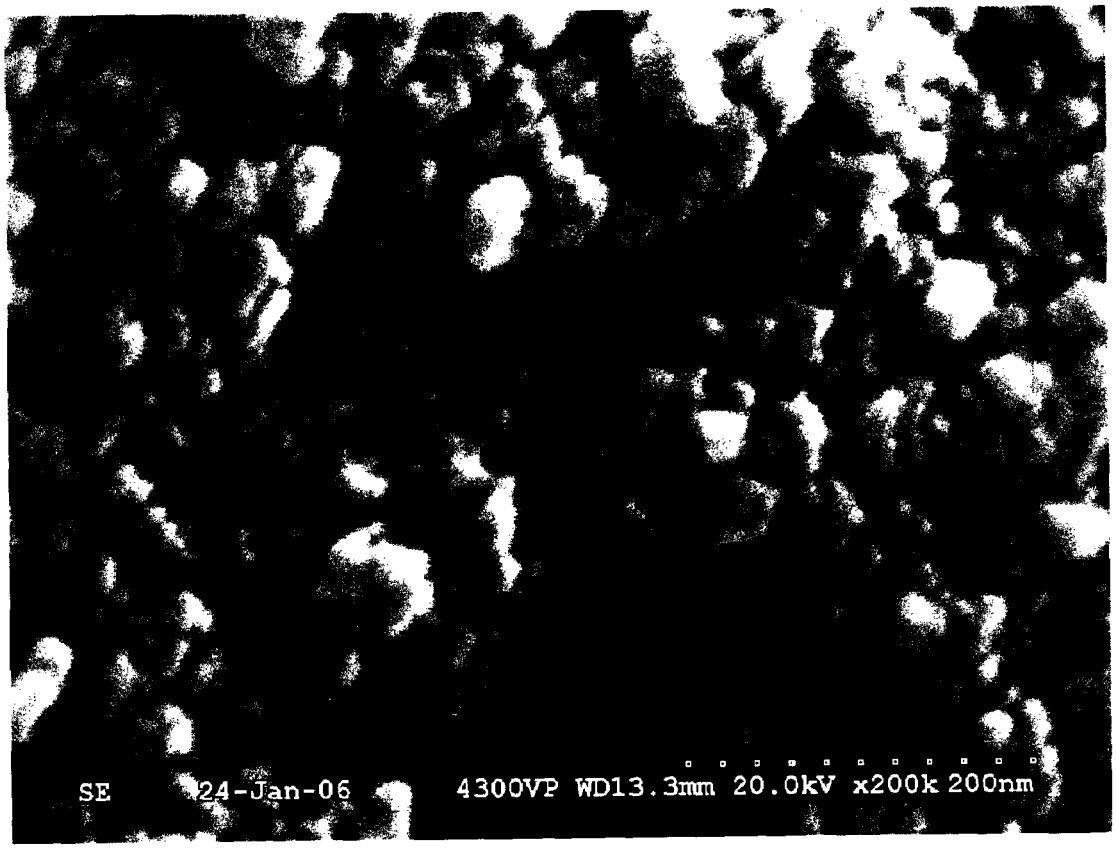
FIG. 8 shows a Scanning Electron Microscope (SEM) image of the sample analyzed in FIG. 3, wherein the scale is 200 nm.

Further samples have been prepared in a similar manner as previously defined, but in these cases, the samples have been annealed. A sample was annealed at 300° C., under a vacuum of 100 mTorr, for a period of 2 hours, and various analyses have been carried out on it including the X-ray diffraction (XRD) pattern of FIG. 3, the Scanning Electron Microscope (SEM) image of FIG. 7 (scale of 1 μm), and the Scanning Electron Microscope (SEM) image of FIG. 8 (scale of 200 nm).

Figure 4:
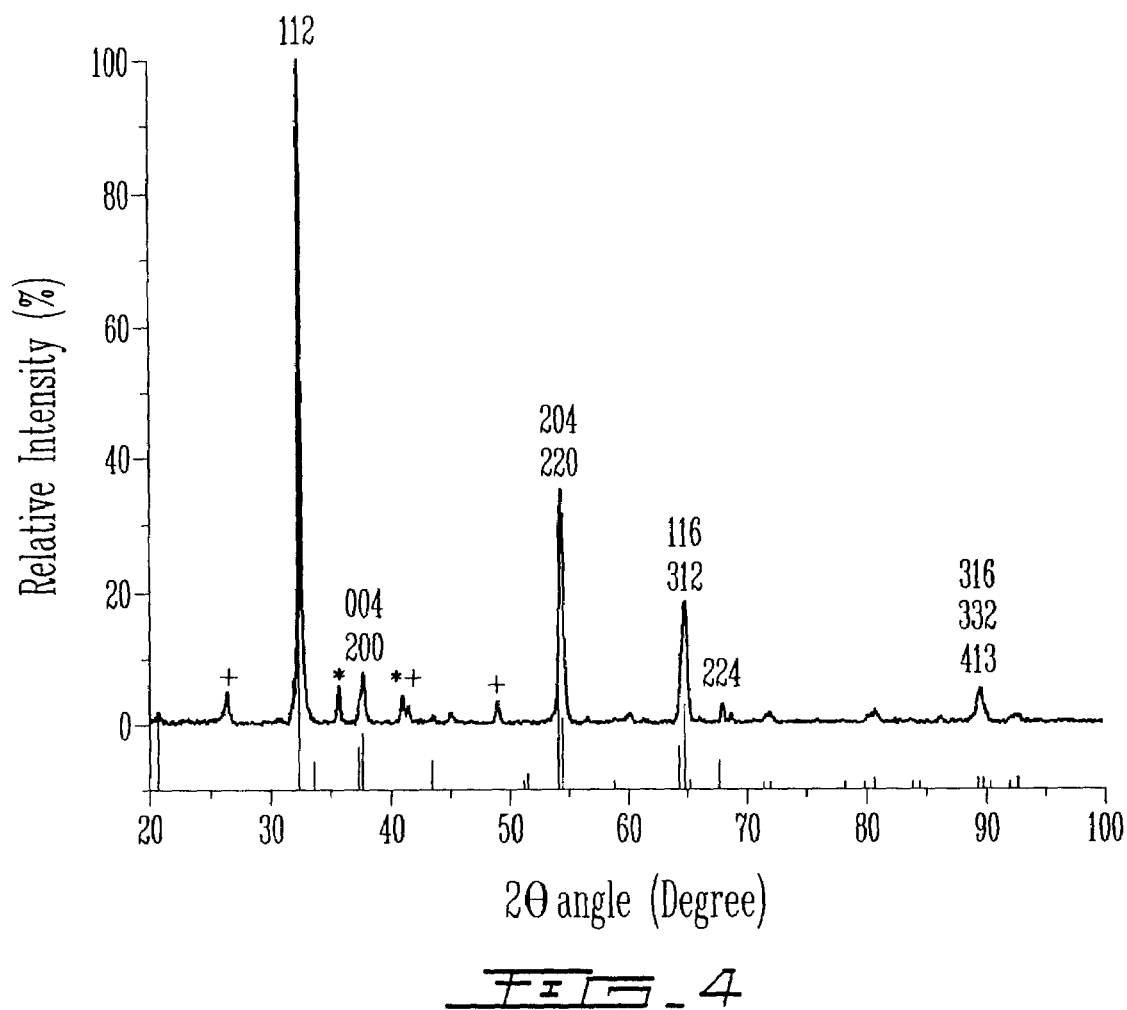
FIG. 4 shows a X-ray diffraction (XRD) pattern of a $CuInS_2$ sample obtained by a process according to another embodiment of the present invention, wherein the sample was annealed at 500° C., under a vacuum of 100 mTorr, for a period of 2 hours.
Figure 9:
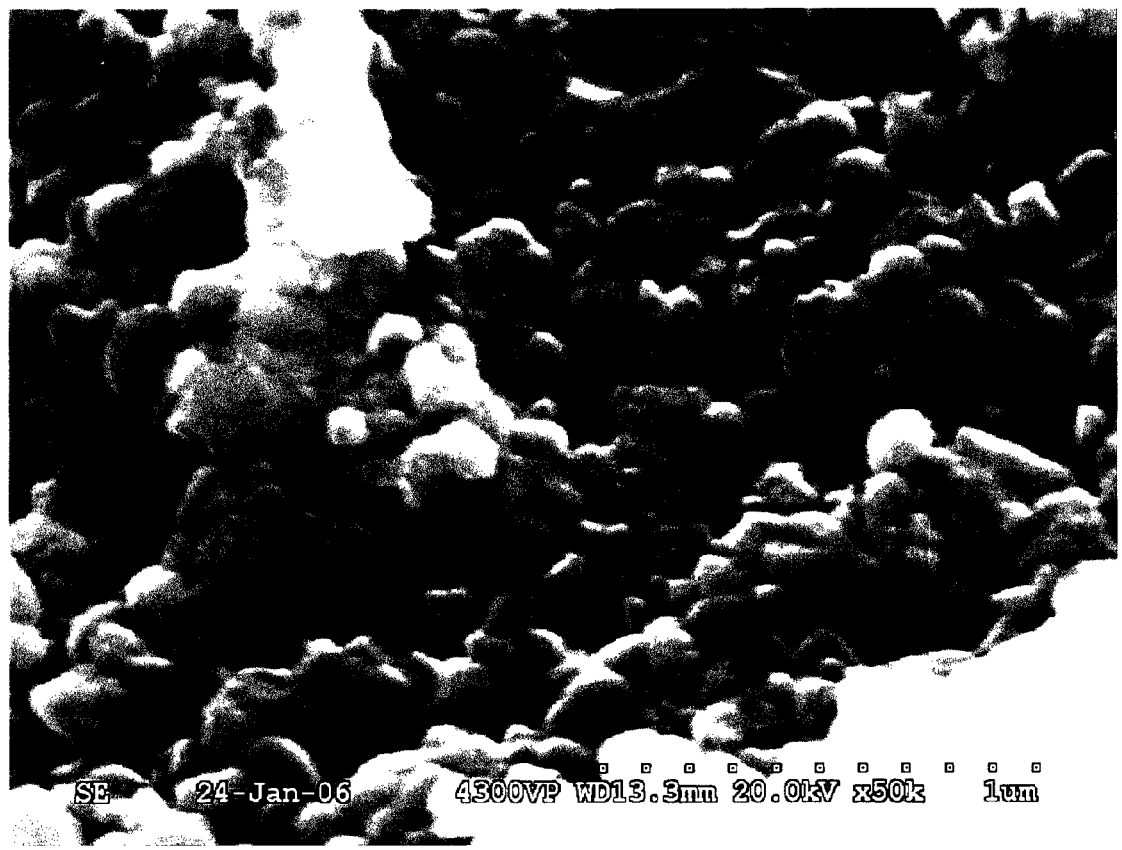
FIG. 9 shows a Scanning Electron Microscope (SEM) image of the sample analyzed in FIG. 4, wherein the scale is 1 μm.
Figure 10:
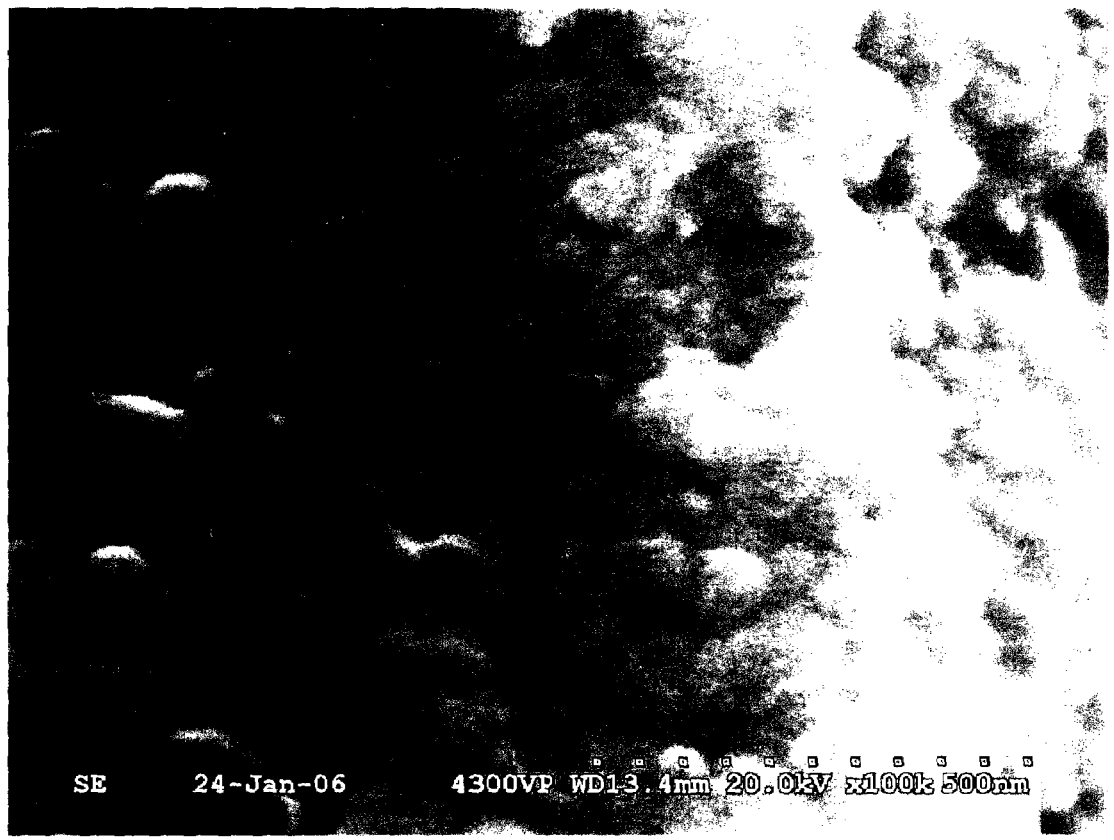
FIG. 10 shows a Scanning Electron Microscope (SEM) image of the sample analyzed in FIG. 4, wherein the scale is 500 nm.

Another sample was annealed at 500° C., under a vacuum of 100 mTorr, for a period of 2 hours, and various analyses have been carried out on it including the X-ray diffraction (XRD) pattern of FIG. 4, the Scanning Electron Microscope (SEM) image of FIG. 9 (scale of 1 μm), and the Scanning Electron Microscope (SEM) image of FIG. 10 (scale of 500 nm). In FIG. 4, the peaks labeled with "*" correspond to an In$_2$O$_3$ phase and the peaks labeled with "+" correspond to a Cu$_2$S phase.

Figure 3:
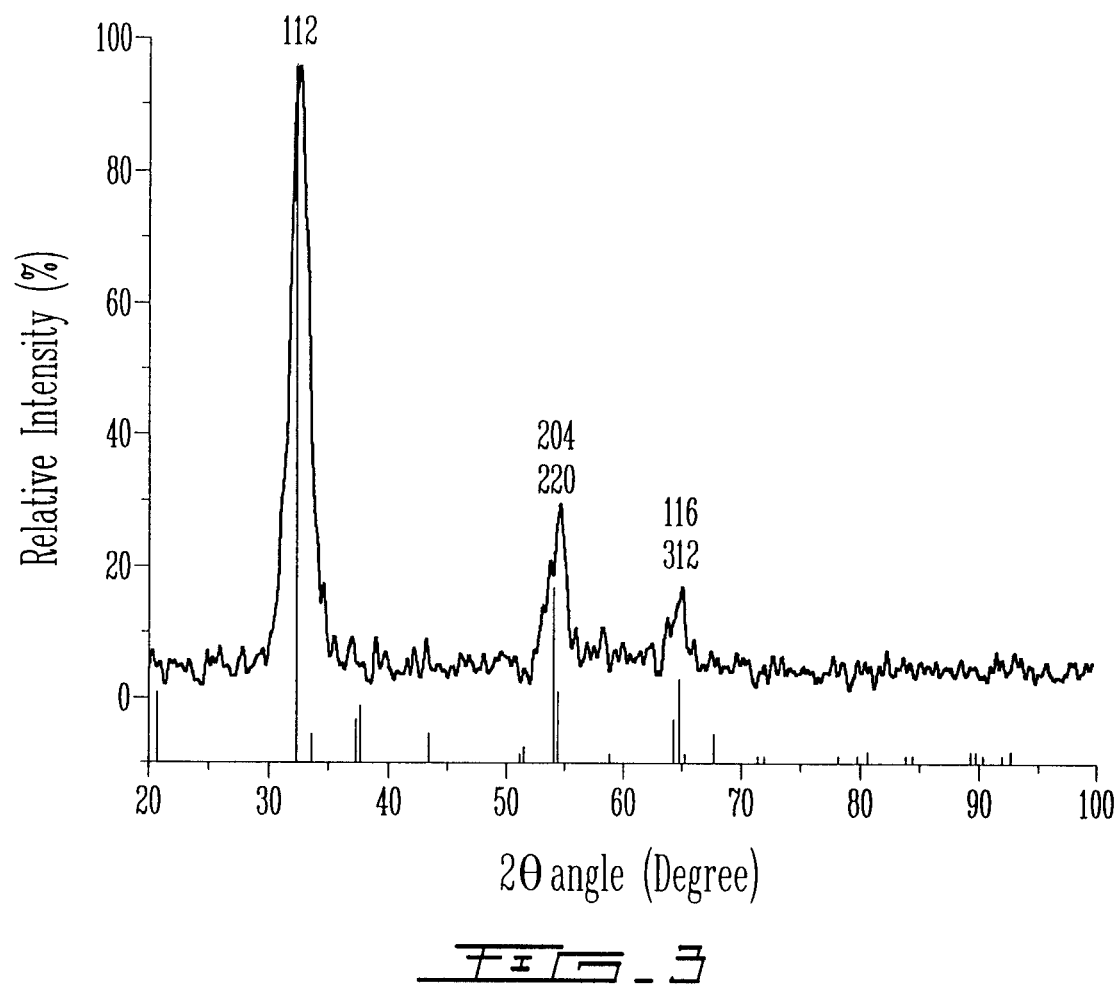
FIG. 3 shows a X-ray diffraction (XRD) pattern of a $CuInS_2$ sample obtained by a process according to another embodiment of the present invention, wherein the sample was annealed at 300° C., under a vacuum of 100 mTorr, for a period of 2 hours.

The trend that can be seen from FIGS. 2 to 4 is that a better crystallinity is observed for higher annealing temperatures. The general trend that can be seen from FIGS. 5 to 10 is that particles coalescence is more significant at higher annealing temperatures.

The UV-visible spectrum was obtained from particles of the sample suspended in acetonitrile; the spectrum is characteristic of semiconducting particles with a bandgap energy of 1.55 eV, very close to the theoretical value of 1.5 eV for CuInS$_2$. The XRD data of FIGS. 2 to 4 were obtained from a D5000 Siemens diffractometer, using a cobalt tube (wavelength $\lambda_1$: 1.78897 Å and $\lambda_2$: 1.79285 Å) and a silicon detector. Diffractograms were recorded between 2θ ranging from 20° to 100°. Intensities were recorded in counts per second (CPS) and normalized in percentage of intensities. The peak assignment was done with the DiffractAT software. The samples of Example 1 were also analyzed by atomic emission spectroscopy using an Inductive Coupled Plasma (ICP) and the stoechiometry obtained before and after annealing is 0.98 Cu for 1 In. Another ICP analysis was carried out on a sample prepared according to a similar manner as previously described (solutions A and B were mixed together at room temperature) and the stoechiometry obtained before and after annealing is 0.93 Cu for 1 In. The results from ICP as well as FIGS. 1 to 10 thus clearly show that the obtained product was semiconducting CuInS$_2$ having a good crystallinity, with a particle diameter of less than 100 nm.

Example 2

Synthesis of AgInS$_2$

InCl$_3$ (165.9 mg, 0.75 mmol) was dissolved in 17 mL anhydrous N-methylimidazole (NMI) in a 250 mL two-neck flask under argon at room temperature. Lithium sulfide (137.8 mg, 1.5 mmol) was suspended in 15 mL NMI at room temperature. Both solutions were mixed together and after one hour in an ultrasonic bath, a transparent yellowish solution (solution A) was obtained.

In a separate 250 mL two-neck flask, AgCN (100.4 mg, 0.75 mmol) was dissolved in 9 mL NMI under argon (solution B).

Figure 11:
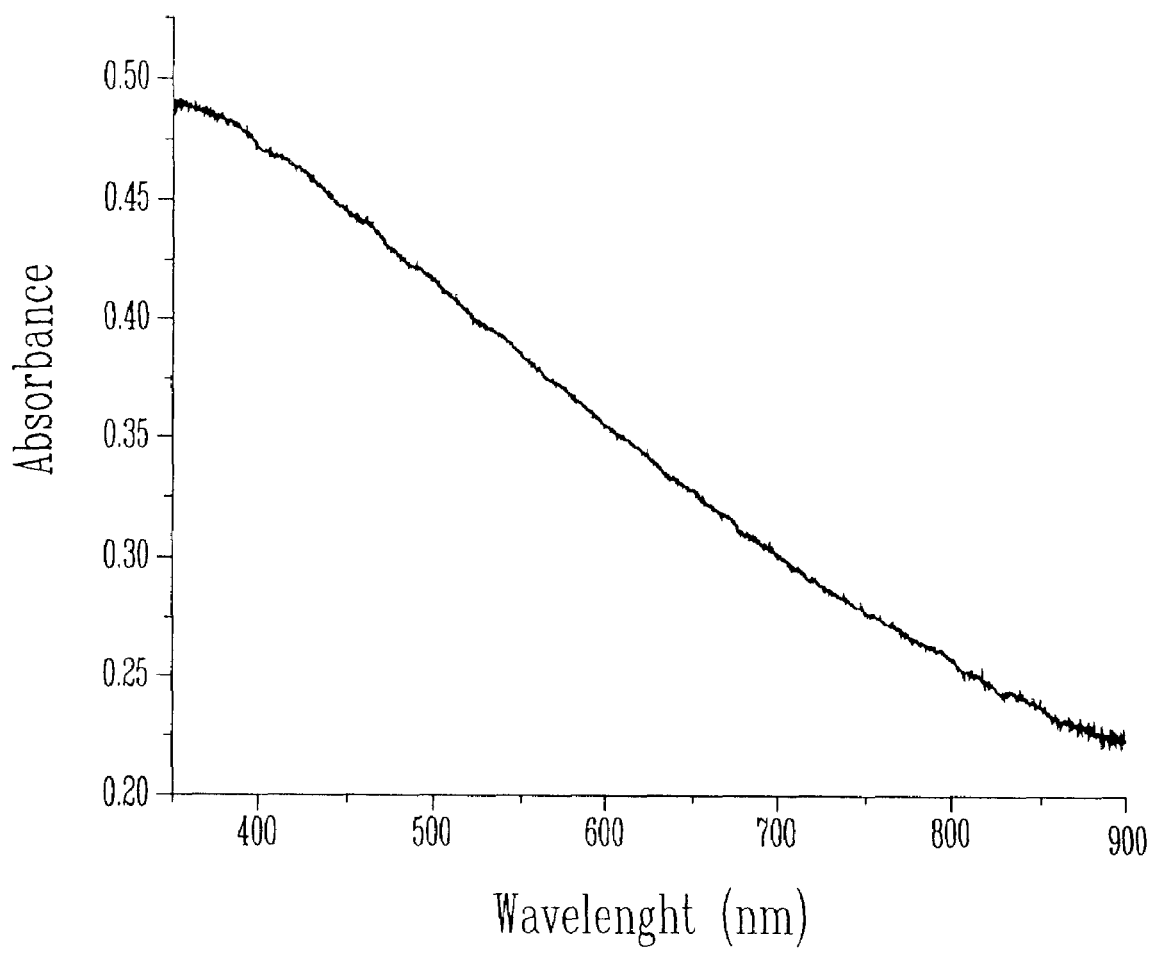
FIG. 11 shows a UV-visible absorption spectrum of a $AgInS_2$ sample obtained by a process according to another embodiment of the present invention, wherein the sample has not been annealed.

Then, solution B was added dropwise over 15 minutes to solution A under argon at 25° C. The resulting dark orange suspension was stable against aggregation. The mixture was heated during 1 hour at 80° C. Then, the particles were centrifuged, filtered and dried at room temperature under vacuum overnight. The sample obtained in Example 2 was then analyzed by UV-visible spectroscopy (FIG. 11). The UV-visible spectrum was obtained from particles of the sample suspended in acetonitrile; the spectrum is characteristic of semiconducting particles with a bandgap energy of 1.85 eV, very close to the theoretical value of 1.8 eV for AgInS$_2$.

Further samples have been prepared in a similar manner as previously defined, but in these cases, the samples have been annealed. A sample was annealed at 100° C., under a vacuum of 100 mTorr, for a period of 1 hour, and it was characterized by the X-ray diffraction (XRD) pattern of FIG. 12. Another sample was annealed at 400° C., under a vacuum of 100 mTorr, for a period of 2 hours, and it was characterized by the X-ray diffraction (XRD) pattern of FIG. 13. In FIG. 13, the peaks labeled with "*" correspond to an Ag$_2$S phase and the peaks labeled with "+" correspond to an In$_2$O$_3$ phase.

Figure 12:
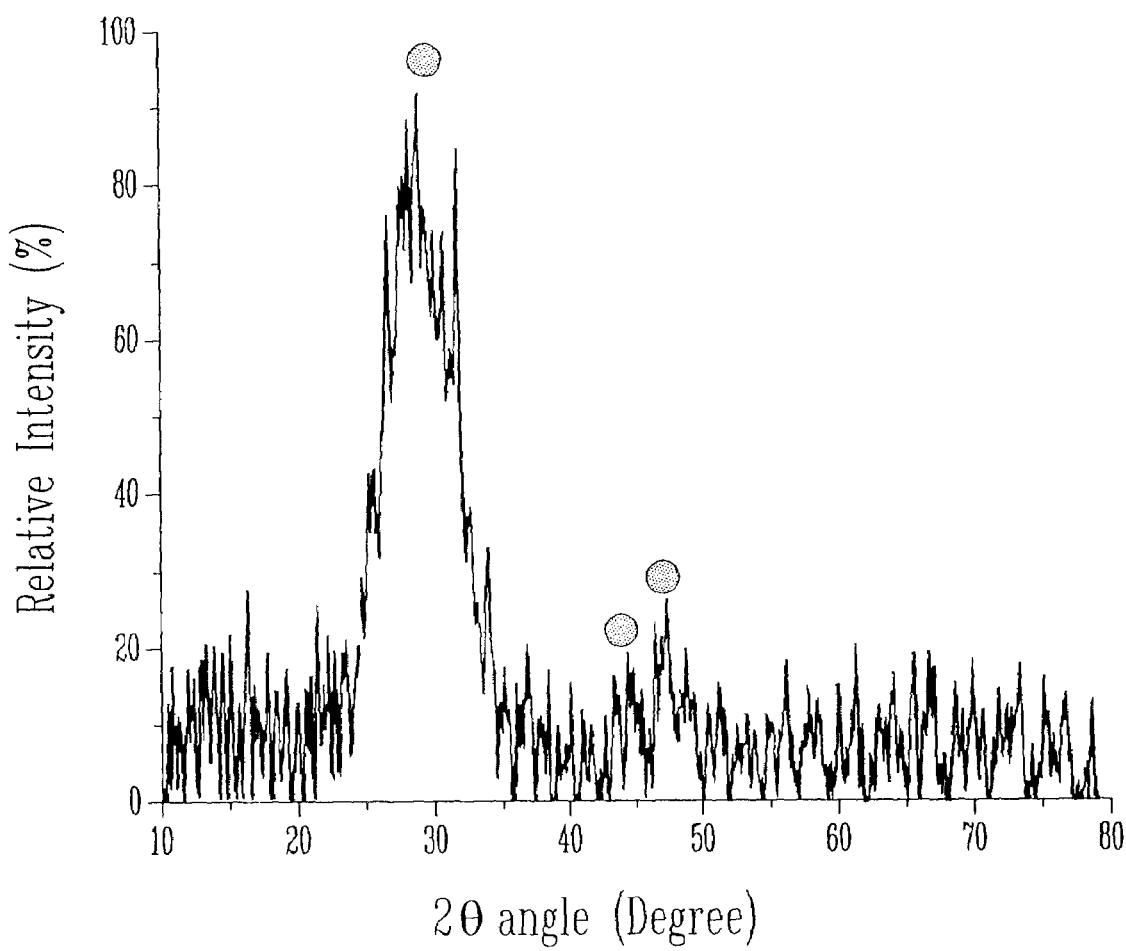
FIG. 12 shows a X-ray diffraction (XRD) pattern of an $AgInS_2$ sample obtained by a process according to another embodiment of the present invention, wherein the sample has been annealed at 100° C., under a vacuum of 100 mTorr, for a period of 1 hour.
Figure 13:
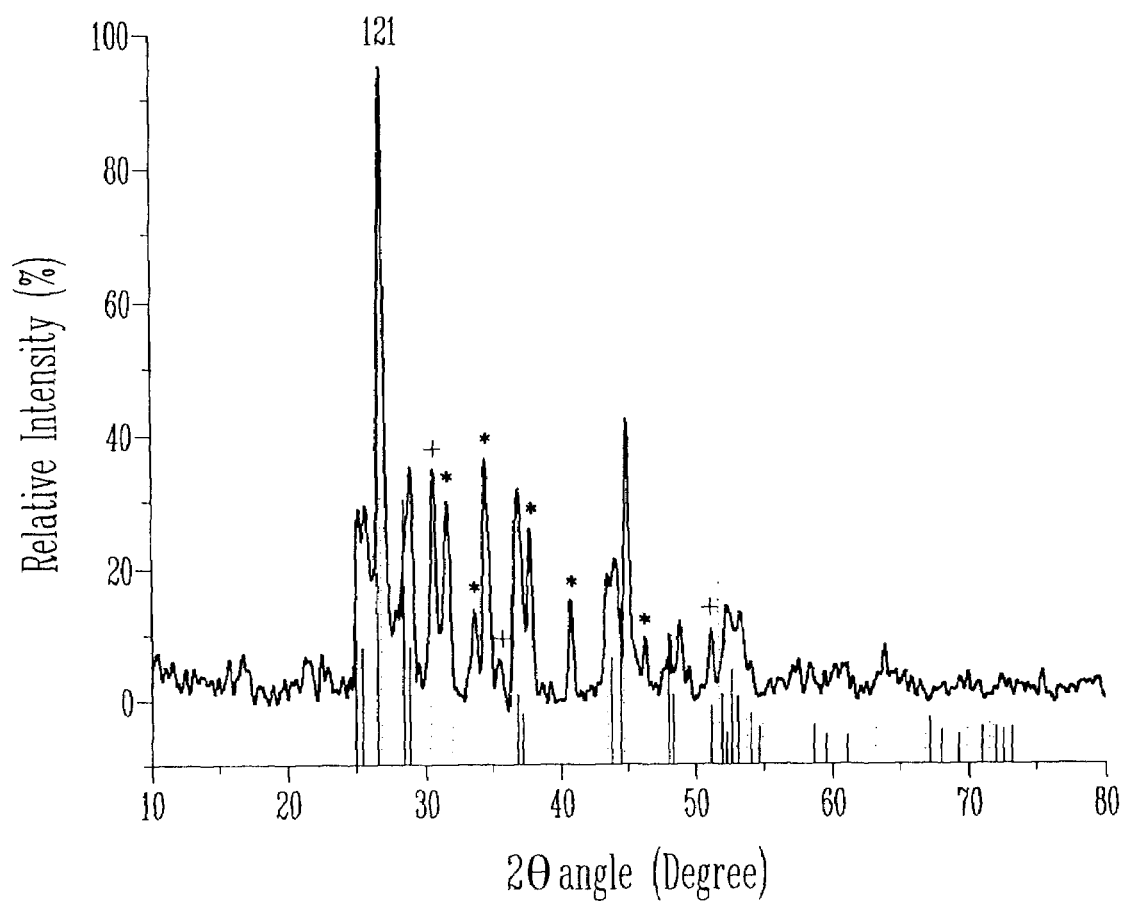
FIG. 13 shows a X-ray diffraction (XRD) pattern of an AgInS$_2$ sample obtained by a process according to another embodiment of the present invention, wherein the sample has been annealed at 400° C., under a vacuum of 100 mTorr, for a period of 2 hours.

The trend that can be seen from FIGS. 12 and 13 is that a better crystallinity is observed for higher annealing temperatures.

The XRD data of FIGS. 12 and 13 were obtained from a diffractometer, using a copper tube (wavelength $\lambda_1$: 1.5418 Å) and a silicon detector. Diffractograms were recorded between 2θ ranging from 10° to 80°. Intensities were recorded in counts per second (CPS) and normalized in percentage of intensities. The peak assignment was done with the DiffractAT software. The samples of Example 2 were also analyzed by atomic emission spectroscopy using an Inductive Coupled Plasma (ICP) and the stoechiometry obtained before annealing is 1.07 Ag for 1 In. The results from ICP as well as FIGS. 11 to 13 thus clearly show that the obtained product was crystalline semiconducting $AgInS_2$.

Example 3

Preparation of Thin Film Layer High Performance Electrodes

In order to prepare thin film layer high performance electrodes using the compounds obtained by the process of the present invention, a polymeric binder and conductivity enhancer are used. The binder and the conductivity enhancer are mixed together with an organic solvent and a chalcopyrite-type compound so to obtain a suspension. Then, the suspension is coated on a substrate (used as a current collector) using a blade applicator and then dried under vacuum at 50° C. during 12 hours.

An example of a composition for such a suspension can be 95% wt chalcopyrite-type compound such as $CuInS_2$, 3% wt polyvinylidene fluoride (PVDF) and/or poly(vinylidene fluoride-co-hexafluoropropylene) (PVDF-HFP) as binder, 2% carbon black powder as conductivity enhancer and N-methylpyridinone (NMP) as solvent.

Example 4

Synthesis of CdS $CdCl_2$ (74.5 mg, 0.406 mmol) was dissolved in 5 mL of anhydrous N-methylimidazole (NMI) in a 250 mL two-neck flask under argon at room temperature. Lithium sulfide (22 mg, 0.47 mmol) was suspended in 40 mL of NMI at room temperature. Both solutions were mixed together. The resulting yellowish suspension was stirred during 2 hour at 25° C. and then heated at 80° C. for one hour. Then, the particles were centrifuged, filtered and dried at room temperature under vacuum overnight. The CdS particles obtained were then annealed for at least 2 hour at 300° C. at 100 mTorr.

Figure 14:
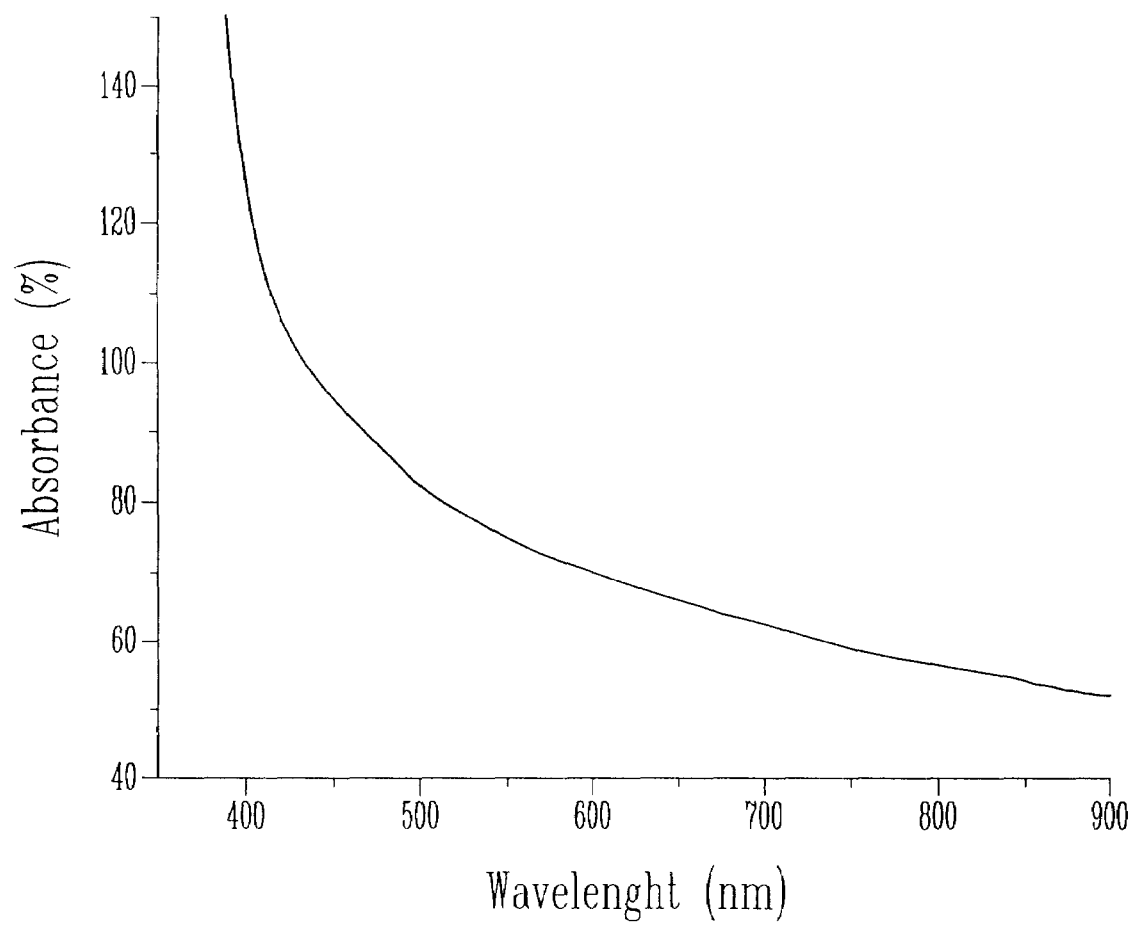
FIG. 14 shows a UV-visible absorption spectrum of a CdS sample obtained by a process according to another embodiment of the present invention, wherein the sample has been annealed at 300° C., under a vacuum of 100 mTorr, for a period of 2 hours.
Figure 15:
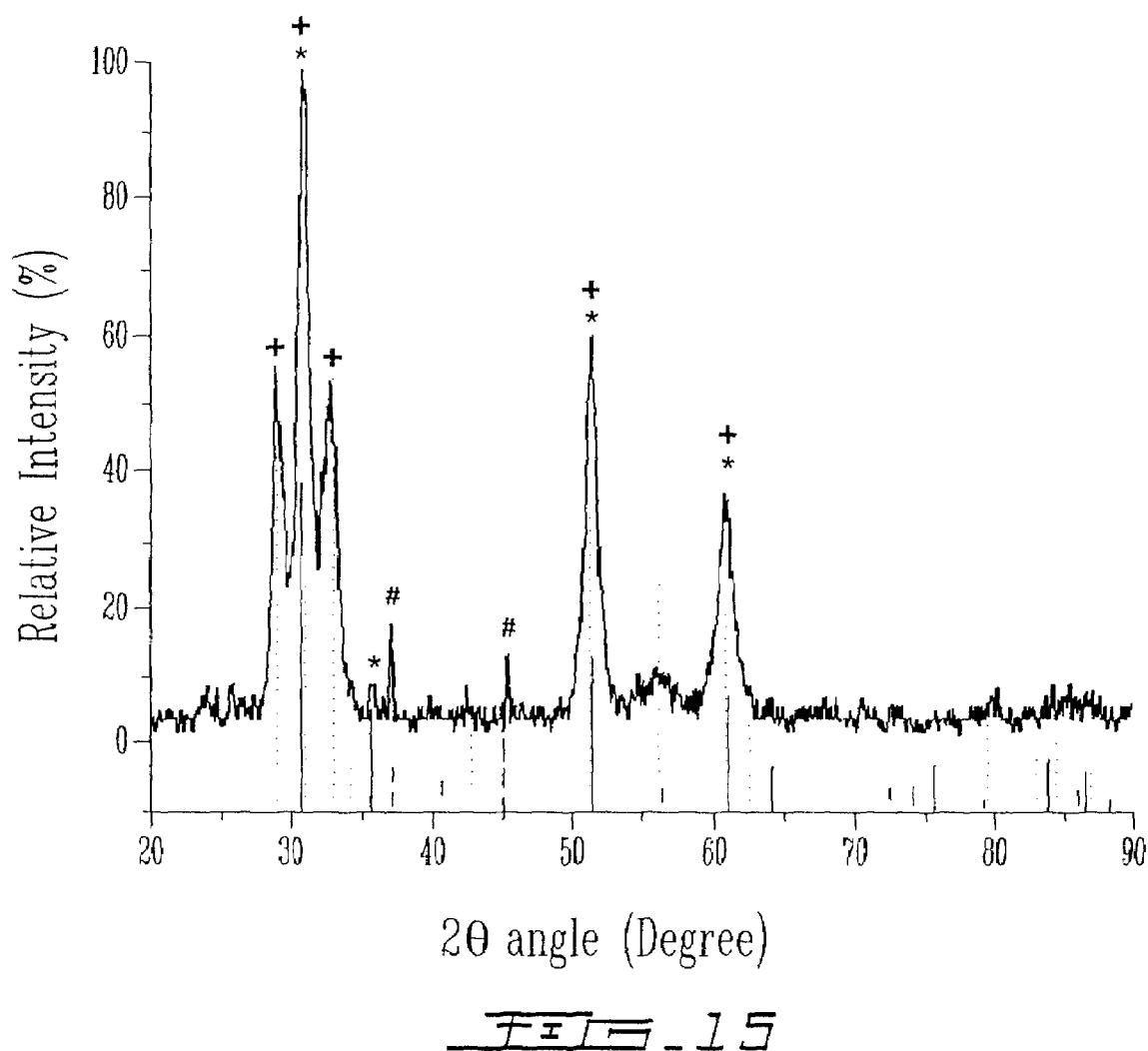
FIG. 15 shows a X-ray diffraction (XRD) pattern of the CdS sample analyzed in FIG. 14.

The sample obtained in Example 4 was analyzed by UV-visible spectroscopy (FIG. 14) and by XRD (FIG. 15). The UV-visible spectrum was obtained from particles of the sample suspended in N-methylimidazole; the spectrum is characteristic of semiconducting particles. The XRD data of FIG. 15 were obtained from a D5000 Siemens diffractometer, using a cobalt tube (wavelength $\lambda_1$: 1.78897 Å and $\lambda_2$: 1.79285 Å) and a silicon detector. Diffractograms were recorded between 2θ ranging from 20° to 90°. Intensities were recorded in counts per second (CPS) and normalized in percentage of intensities. The peak assignment was done with the DiffractAT software. In FIG. 15, the peaks labeled with "*" correspond to a crystalline cubic central face phase of CdS, the peaks labeled with "+" correspond to another crystalline phase of hexagonal α-CdS and the peaks labeled with "#" correspond to a hexagonal phase of metallic Cd.

The sample of Example 4 was also analyzed by Inductive Coupled Plasma (ICP) and the stoechiometry obtained before and after annealing is 1 Cd for 1 S. The results from ICP as well as FIGS. 14 and 15 thus clearly show that the obtained product was semiconducting CdS having a good crystallinity.

Example 5

Synthesis of InP $InCl_3$ (183.7 mg, 83.4 mmol) was dissolved in 20 mL of anhydrous N-methylimidazole (NMI) in a 250 mL two-neck flask under argon at room temperature. $(Me_3Si)_3P$ (200.4 mg, 80 mmol) was dissolved in 50 mL of anhydrous acetonitrile at room temperature. Both solutions were mixed together. The resulting dark red suspension was stirred during 12 hours at 25° C. Then, the particles were centrifuged, filtered and dried at room temperature under vacuum overnight. The InP particles obtained were annealed for at least 3 hour at 150° C. at 100 mTorr.

Figure 16:
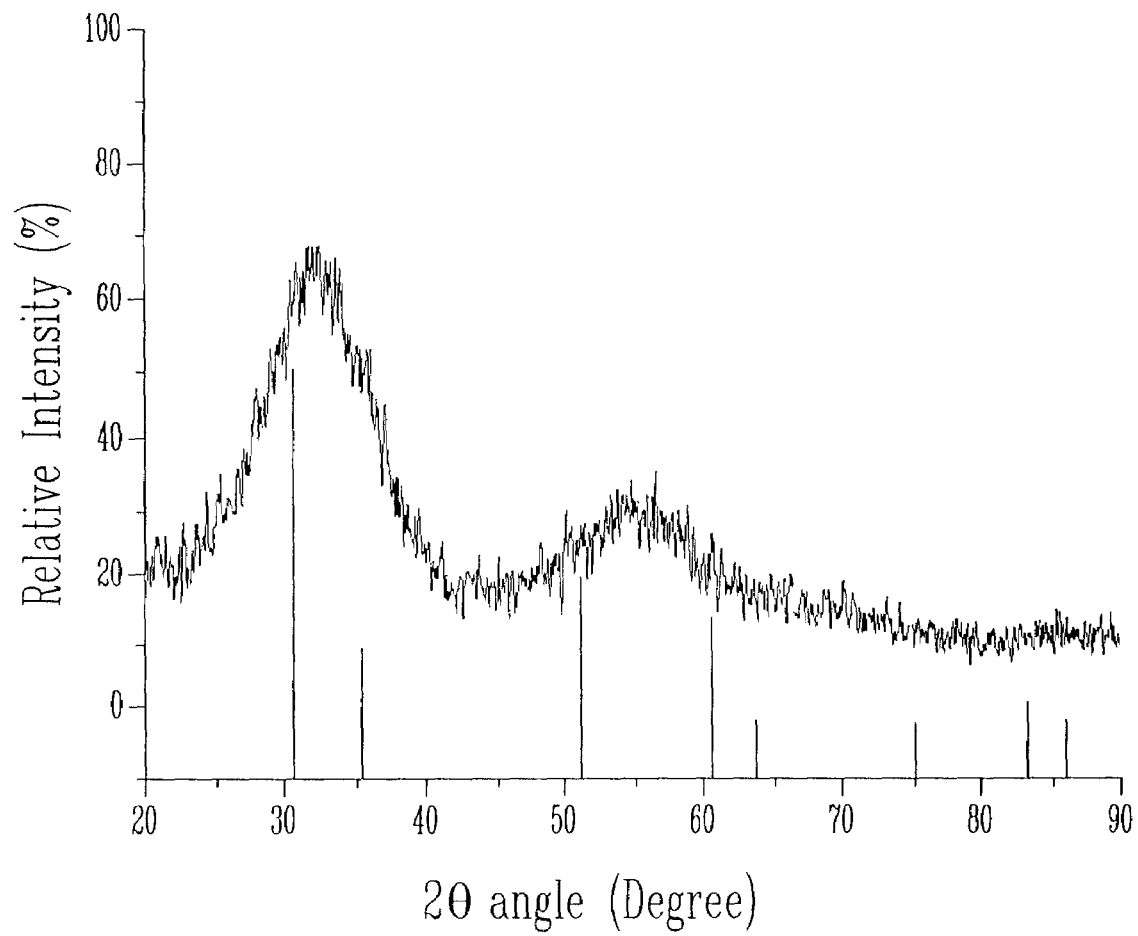
FIG. 16 shows a X-ray diffraction (XRD) pattern of an InP sample obtained by a process according to another embodiment of the invention.

The sample obtained in Example 5 was analyzed by XRD (FIG. 16). The XRD data of FIG. 16 were obtained from a D5000 Siemens diffractometer, using a cobalt tube (wavelength $\lambda_1$: 1.78897 Å and $\lambda_2$: 1.79285 Å) and a silicon detector. Diffractograms were recorded between 2θ ranging from 20° to 90°. Intensities were recorded in counts per second (CPS) and normalized in percentage of intensities. The peak assignment was done with the DiffractAT software. The sample of Example 5 was also analyzed by Energy dispersive X-ray spectroscopy (EDX) and the stoechiometry obtained before and after annealing is 1 In for 1.12 P. The results from EDX as well as FIG. 16 thus show that the obtained product was InP. Moreover, XPS (X-Ray Photoelectron Spectroscopy) measurements have shown that InP is present at the material surface.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A process for preparing a compound of formula $M^3M^1A_2$, said process comprising reacting a compound of formula $M^2M^1A_2$ with a compound of formula $M^3X^2$, in the presence of at least one coordinating solvent, in order to obtain said compound of formula $M^3M^1A_2$, wherein $M^1$ is chosen from $B^{3+}$, $Al^{3+}$, $Ga^{3+}$, $In^{3+}$, $Tl^{3+}$, $Fe^{3+}$, and $Au^{3+}$;

$M^2$ is chosen from $Li^+$, $Na^+$, $K^+$, $Cs^+$, $(T^1)_3Si-$, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;

$M^3$ is chosen from $Cu^+$, $Ag^+$, $Li^+$, $Na^+$, $K^+$, $Cs^+$, $Rb^+$, $Fr^+$, $Au^+$, and $Hg^+$;

A is chosen from S, Se, and, Te;

$X^2$ is chosen from $Cl^-$, $Br^-$, $I^-$, $F^-$, $CH_3COO^-$, $NO_3^-$, $OCN^-$, $SCN^-$, and $CN^-$; and said coordinating solvent is chosen from

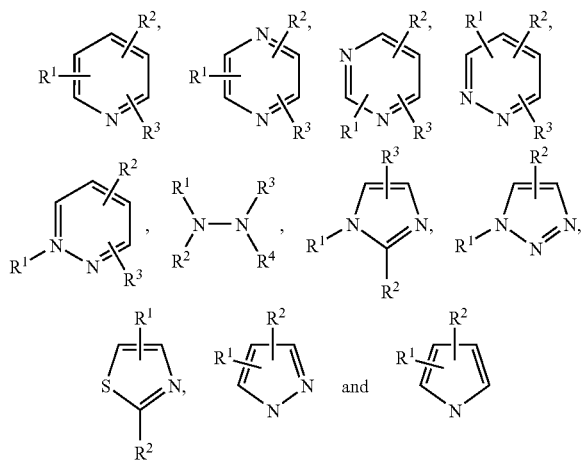

wherein
- $R^1$, $R^2$, $R^3$ and $R^4$ are the same or different and are chosen from a hydrogen atom, $C_1$-$C_{12}$ alkyl which is linear or branched, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_6$-$C_{20}$ aralkyl, $C_6$-$C_{20}$ alkylaryl, and $C_1$-$C_{12}$ heteroaryl,
- $R^1$ and $R^2$ may be joined together to form a 5 to 14 membered heterocyclyl or is a part of polymer chain or network.

2. The process of claim 1, wherein said coordinating solvent is chosen from N-methylimidazole, N-vinylimidazole, pyrazole, triazole, tetrazole, and mixtures thereof.

3. The process of claim 1, wherein said coordinating solvent is N-methylimidazole.

4. The process of claim 1, wherein $M^3X^2$ and $M^2M^1A_2$ are reacted together at a temperature of about −10° C. to about 180° C.

5. The process of claim 4, wherein said temperature is about −5° C. to about 50° C.

6. The process of claim 1, wherein $M^3X^2$ and $M^2M^1A_2$ are reacted together at room temperature.

7. The process of claim 1, wherein said compound of formula $M^3M^1A_2$ is precipitated, and separated from a mixture comprising said coordinating solvent and a by-product solubilized therein, by means of a filtration.

8. The process of claim 1, wherein said compound of formula $M^3M^1A_2$ is chosen from $CuInS_2$, $CuInSe_2$, $CuInTe_2$, $AuInS_2$, $AuInSe_2$, $AuInTe_2$, $AgInS_2$, $AgInSe_2$, $AgInTe_2$, $HgInS_2$, $HgInSe_2$, $HgInTe_2$, $LiInS_2$, $LiInSe_2$, $LiInTe_2$, $CuGaS_2$, $CuGaSe_2$, $CuGaTe_2$, $AuGaS_2$, $AuGaSe_2$, $AuGaTe_2$, $AgGaS_2$, $AgGaSe_2$, $AgGaTe_2$, $HgGaS_2$, $HgGaSe_2$, $HgGaTe_2$, $CuAlS_2$, $CuAlSe_2$, $CuAlTe_2$, $AuAlS_2$, $AuAlSe_2$, $AuAlTe_2$, $AgAlS_2$, $AgAlSe_2$, $AgAlTe_2$, $HgAlS_2$, $HgAlSe_2$, $HgAlTe_2$, $CuAuS_2$, $CuAuSe_2$, $CuAuTe_2$, $AuAuS_2$, $AuAuSe_2$, $AuAuTe_2$, $AgAuS_2$, $AgAuSe_2$, $AgAuTe_2$, $HgAuS_2$, $HgAuSe_2$, $HgAuTe_2$, $LiFeS_2$, $LiFeSe_2$, $LiFeTe_2$, $AgFeS_2$, $AgFeSe_2$, $AgFeTe_2$ $LiGaS_2$, $LiGaSe_2$, and $LiGaTe_2$.

9. The process of claim 1, wherein said compound of formula $M^3M^1A_2$ is chosen from $CuInS_2$, $AuInS_2$, $AgInS_2$, $AgInSe_2$, $CuGaS_2$, $AuGaS_2$, $CuAlS_2$, and $LiFeS_2$.

10. The process of claim 9, wherein $M^2$ is chosen from $Li^+$, $Na^+$, and $K^+$; and $X^2$ is chosen from $Cl^-$, $Br^-$, $I^-$, $F^-$, and $CN^-$.

11. The process of claim 1, wherein said compound of formula $M^3M^1A_2$ is chosen from $CuInS_2$, and $AgInS_2$.

12. The process of claim 11, wherein $M^2$ is $Li^+$ and $X^2$ is $Cl^-$.

13. The process of claim 1, wherein
- $M^1$ is $In^{3+}$;
- $M^2$ is chosen from $Li^+$, $Na^+$, and $K^+$;
- $M^3$ is chosen from $Cu^+$, and $Ag^+$;
- A is chosen from S and Se; and
- $X^2$ is chosen from $Cl^-$, $Br^-$, $I^-$, $F^-$, and $CN^-$.

14. The process of claim 1, wherein said compound of formula $M^2M^1A_2$ is obtained by reacting a compound of formula $M^1(X^1)_3$ with a compound of formula $(M^2)_2A$ in the presence of at least one coordinating solvent.

15. The process of claim 1, wherein said compound of formula $M^2M^1A_2$ is obtained by reacting a compound of formula $M^1(X^1)_3$ with a compound of formula $(M^2)_2A$ in the presence of at least one coordinating solvent chosen from

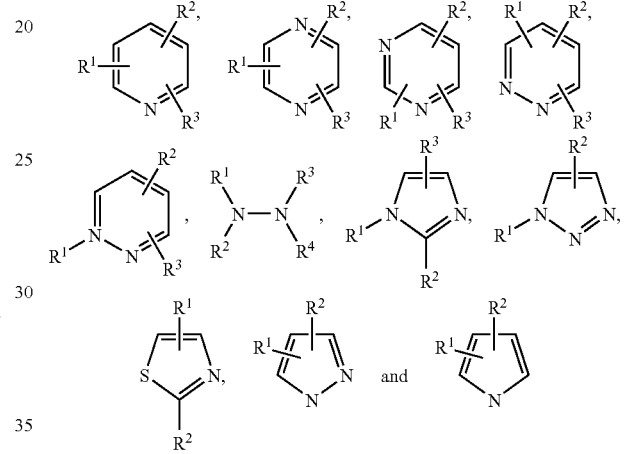

wherein
- $R^1$, $R^2$, $R^3$ and $R^4$ are the same or different and are chosen from a hydrogen atom, $C_1$-$C_{12}$ alkyl which is linear or branched, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_6$-$C_{20}$ aralkyl, $C_6$-$C_{20}$ alkylaryl, and $C_1$-$C_{12}$ heteroaryl,
- $R^1$ and $R^2$ may be joined together to form a 5 to 14 membered heterocyclyl or is a part of polymer chain or network.

16. The process of claim 1, wherein said compound of formula $M^2M^1A_2$ is obtained by reacting a compound of formula $M^1(X^1)_3$ with a compound of formula $(M^2)_2A$ in the presence of at least one coordinating solvent chosen from N-methyl imidazole, N-vinylimidazole, pyrazole, triazole, tetrazole, and mixtures thereof.

17. The process of claim 1, wherein said compound of formula $M^2M^1A_2$ is obtained by reacting a compound of formula $M^1(X^1)_3$ with a compound of formula $(M^2)_2A$ in the presence of N-methylimidazole.

18. The process of claim 1, wherein said compound of formula $M^3M^1A_2$ is $CuInS_2$, $M^2$ is $Li^+$, and $X^2$ is $Cl^-$ 19. The process of claim 18, wherein said coordinating solvent is N-methylimidazole.

20. The process of claim 19, wherein $M^3X^2$ and $M^2M^1A_2$ are reacted together at a temperature of about -5° C. to about 50°C.

21. The process of claim 1, wherein said compound of formula $M^3M^1A_2$ is $AgInS_2$, $M^2$ is $Li^+$, and $X^2$ is $CN^-$ 22. The process of claim 21, wherein said coordinating solvent is N-methylimidazole.

23. The process of claim 22, wherein $M^3X^2$ and $M^2M^1A_2$ are reacted together at a temperature of about -10 °C. to about 180° C.

24. A process for preparing a compound of formula $M^3(M^5,M^1)A_2$, said process comprising reacting a compound of formula $M^2(M^5,M^1)A_2$ with a compound of formula $M^3X^2$, in the presence of at least one coordinating solvent, in order to obtain said compound of formula $M^3(M^5,M^1)A_2$,
wherein
$M^1$ is chosen from $B^{3+}$, $Al^{3+}$, $Ga^{3+}$, $In^{3+}$, $Tl^{3+}$, $Fe^{3+}$, and $Au^{3+}$;
$M^2$ is chosen from $Li^+$, $Na^+$, $K^+$, $Cs^+$, $(T^1)_3Si$—, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;
$M^3$ is chosen from $Cu^+$, $Ag^+$, $Li^+$, $Na^+$, $K^+$, $Cs^+$, $Fb^+$, $Fr^+$, $Au^+$, and $Hg^+$;
$M^5$ is chosen from $B^{3+}$, $Al^{3+}$, $Ga_{3+}$, $In^{3+}$, $Tl^{3+}$, $Fe^{3+}$, and $Au^{3+}$;
A is chosen from S, Se, and, Te; and
$X^2$ is chosen from $Cl^-$, $Br^-$, $I^-$, $F^-$, $CH_3COO^-$, $NO_3^-$, $OCN^-$, $SCN^-$, and $CN^-$;
said coordinating solvent is chosen from

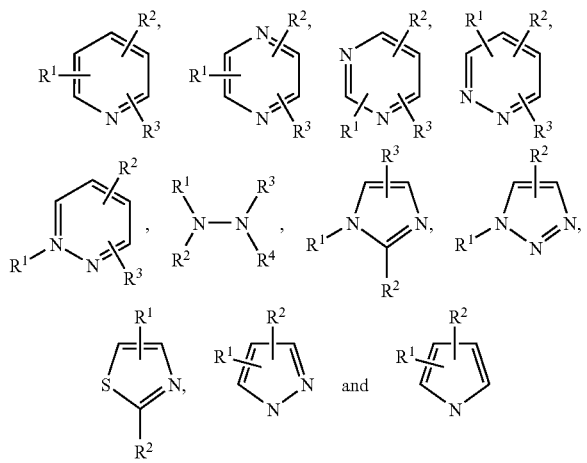

wherein
$R^1$, $R^2$, $R^3$ and $R^4$ are the same or different and are chosen from a hydrogen atom, $C_1$-$C_{12}$ alkyl which is linear or branched, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_6$-$C_{20}$ aralkyl, $C_6$-$C_{20}$ alkylaryl, and $C_1$-$C_{12}$ heteroaryl,
$R^1$ and $R^2$ may be joined together to form a 5 to 14 membered heterocyclyl or is a part of polymer chain or network.

25. The process of claim 24, wherein said compound of formula $M^3(M^5,M^1)A_2$ is chosen from $Cu(Al,In)S_2$, $Ag(Al,In)S_2$, $Cu(Ga,In)S_2$, $Cu(Al,In)Se_2$, $Ag(Al,In)Se_2$, and $Cu(Ga,In)Se_2$.

26. A process for preparing a compound of formula $M^4A$, said process comprising reacting a compound of formula $M^4X^2$ with a compound of formula $(M^2)_2A$, in the presence of at least one coordinating solvent, in order to obtain said compound of formula $M^4A$,
wherein
$M^2$ is chosen from $Li^+$, $Na^+$, $K^+$, $Cs^+$, $(T^1)_3Si$—, and $N(T^2)_4^+$, wherein each $T^1$ independently represents a $C_1$-$C_6$ alkyl which is linear or branched, and each $T^2$ independently represents a hydrogen atom, or a $C_1$-$C_6$ alkyl which is linear or branched;
$M^4$ is chosen from $Cd^{2+}$, $Co^{2+}$, $Ni^{2+}$, $Zn^{2+}$, $Hg^{2+}$, $Mg^{2+}$, $Mn^{2+}$, $Fe^{2+}$, and $Pb^{2+}$.
A is chosen from S, Se, and Te; and
X is chosen $Cl^-$, $Br^-$, $I^-$, $F^-$, $CH_3COO^-$, $NO_3^-$, $OCN^-$, $SCN^-$, and $CN^-$;
said coordinating solvent is of formula:

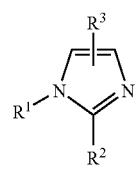

wherein
$R^1$, $R^2$, $R^3$ and $R^4$ are the same or different and are chosen from a hydrogen atom, $C_1$-$C_{12}$ alkyl which is linear or branched, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_6$-$C_{20}$ aralkyl, $C_6$-$C_{20}$ alkylaryl, and $C_1$-$C_{12}$ heteroaryl,
$R^1$ and $R^2$ may be joined together to form a 5 to 14 membered heterocyclyl or is a part of polymer chain or network.

27. The process of claim 26, wherein said compound of formula $M^4A$ is chosen from CdS, CdSe, CdTe, CoS, CoSe, CoTe, NiS, NiSe, NiTe, MgS, MgSe, MgTe, MnS, MnSe, MnTe, FeS, FeSe, FeTe, ZnS, ZnSe, ZnTe, PbS, PbSe, PbTe, ZnS, ZnSe, and ZnTe.

28. The process of claim 26, wherein said compound of formula $M^4A$ is chosen from CdS, CdSe, CdTe, CoS, and ZnSe.

29. The process of claim 26, wherein said compound of formula $M^4A$ is chosen from CdS, CdSe, and CdTe.

30. The process of claim 26, wherein said compound of formula $M^4A$ is CdS, $M^2$ is $Li^+$, and X is $Cl^-$.

31. The process of claim 30, wherein said coordinating solvent is N-methylimidazole.

32. The process of claim 31, wherein $M^4X_2$ and $(M^2)_2A$ are reacted together at a temperature of about -10° C. to about 180° C.

33. A process for preparing a compound of formula $M^1A$, said process comprising reacting a compound of formula $M^1X_3$ with a compound of formula $(M^2)_3A$ in the presence of a coordinating solvent, so as to obtain said compound of formula $M^1A$,
wherein
$M^1$ is chosen from $B^{3+}$, $Al^{3+}$, $Ga^{3+}$, $In^{3+}$, $Tl^{3+}$, $Fe^{3+}$, and $Au^{3+}$;
$M^2$ is chosen from $Li^+$, $Na^+$, $K^+$, $Cs^+$, $(T^1)_3Si$—, and $N(T^2)_4$, wherein each $T^1$ independently represents a $C_1$-$C_6$ alkyl which is linear or branched, and each $T^2$ independently represents a hydrogen atom, or a $C_1$-$C_6$ alkyl which is linear or branched;
A is chosen from N, P, and As; and
X is chosen from $Cl^-$, $Br^-$, $I^-$, $F^-$, $CH_3COO^-$, $NO_3^-$, $OCN^-$, $SCN^-$, and $CN^-$; and said coordinating solvent is of formula:

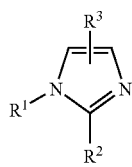

wherein
$R^1$, $R^2$, $R^3$ and $R^4$ are the same or different and are chosen from a hydrogen atom, $C_1$-$C_{12}$ alkyl which is linear or branched, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_6$-$C_{20}$ aralkyl, $C_6$-$C_{20}$ alkylaryl, and $C_1$-$C_{12}$ heteroaryl,
$R^1$ and $R^2$ may be joined together to form a 5 to 14 membered heterocyclyl or is a part of polymer chain or network.

34. The process of claim 33, wherein said compound of formula $M^1A$ is chosen from GaP, GaAs, GaN, InP, InAs, and InN.

35. The process of claim 33, wherein said compound of formula $M^1A$ is InP, $M^1X_3$ is $InCl_3$, and $(M^2)_3A$ is $((CH_3)_3Si)_3P$.

36. The process of claim 35, wherein said coordinating solvent is N-methylimidazole.

37. The process of claim 36, wherein $M^1X_3$ and $(M^2)_3A$ are reacted together at a temperature of about 0° C. to about 40° C.

38. A composition comprising $InCl_3$ and a coordinating solvent chosen from

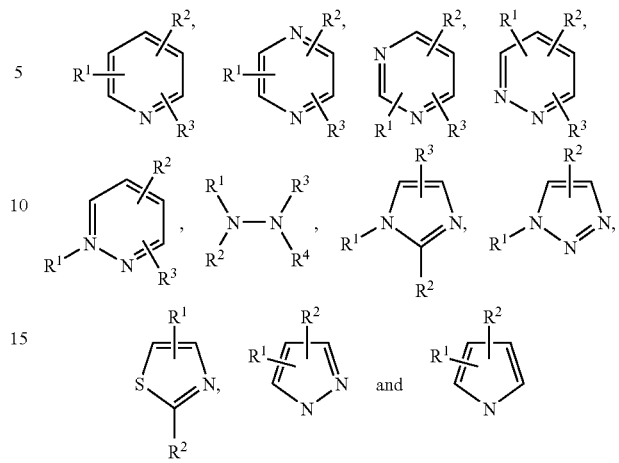

wherein
$R^1$, $R^2$, $R^3$ and $R^4$ am the same or different and am chosen from a hydrogen atom, $C_1$-$C_{12}$ alkyl which is linear or branched, $C_3$-$C_{12}$ cycloalkyl, $C_1$-$C_{12}$ heterocyclyl, $C_2$-$C_8$ alkenyl, $C_2$-$C_8$ alkynyl, $C_6$-$C_{12}$ aryl, $C_6$-$C_{20}$ aralkyl, $C_6$-$C_{20}$ alkylaryl, and $C_1$-$C_{12}$ heteroaryl,
$R^1$ and $R^2$ may be joined together to form a 5 to 14 membered heterocyclyl or is a part of polymer chain or network.

* * * * *